US012724535B2

(12) United States Patent
Jeong

(10) Patent No.: US 12,724,535 B2
(45) Date of Patent: Sep. 1, 2026

(54) CONTROLLER AND MEMORY SYSTEM INCLUDING A MAILBOX

(71) Applicant: SK hynix Inc., Gyeonggi-do (KR)

(72) Inventor: Yoon Seok Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 56 days.

(21) Appl. No.: 18/882,762

(22) Filed: Sep. 12, 2024

(65) Prior Publication Data

US 2025/0335093 A1 Oct. 30, 2025

(30) Foreign Application Priority Data

Apr. 25, 2024 (KR) ........................ 10-2024-0055302

(51) Int. Cl.
*G06F 3/06* (2006.01)

(52) U.S. Cl.
CPC ............ *G06F 3/061* (2013.01); *G06F 3/0659* (2013.01); *G06F 3/0673* (2013.01)

(58) Field of Classification Search
CPC ....... G06F 3/061; G06F 3/0659; G06F 3/0673
See application file for complete search history.

(56) References Cited

U.S. PATENT DOCUMENTS 11,392,320 B2 * 7/2022 Benisty ............... G06F 9/30101
2014/0176573 A1 * 6/2014 Vembu ...................... G06T 1/20 345/502
2014/0189212 A1 * 7/2014 Slaight .................. G06F 3/0613 710/22
2016/0343429 A1 * 11/2016 Nieuwejaar ......... G06F 11/0751
2018/0123880 A1 * 5/2018 Wen .................... H04L 41/0803
2019/0278514 A1 * 9/2019 Chaturvedi ........... G06F 3/0659
2020/0242068 A1 * 7/2020 Lin ..................... G06F 13/4221
2022/0391093 A1 * 12/2022 Kang .................... G06F 3/0604
2023/0109300 A1 * 4/2023 Shin .................... G06F 13/1668 710/6
2023/0236742 A1 7/2023 Sehgal et al.
2025/0315377 A1 * 10/2025 Horwich ............. G06F 13/4022

OTHER PUBLICATIONS

Ben Widawsky et al., [Apr. 2014] cxl/mem: Implement polled mode mailbox, 2021, pp. 1-49.

* cited by examiner

*Primary Examiner* — Yong J Choe
(74) *Attorney, Agent, or Firm* — IP&T GROUP LLP

(57) ABSTRACT

A memory system includes at least one memory device and a controller comprising at least one mailbox configured to receive a doorbell signal to output an interrupt signal, a processor configured to process a mailbox command based on the interrupt signal, and at least one logic configured to perform a preset operation. The at least one mailbox is configured to transfer, to the processor, the interrupt signal based on a first doorbell signal corresponding to a first command when receiving the first command input from a host, and transfer, to the at least one logic, a second doorbell signal corresponding to a second command when receiving the second command input from the host.

20 Claims, 13 Drawing Sheets

FIG. 6

AFTER CONFIGURATION COMMAND
318
ACCESS
382
DOORBELL
ACCESS
384
RETURN CODE
ACCESS
386
OPCODE
ACCESS
388
PAYLOAD REGISTERS
SUCCESS/ ABORTED/ UNSUPPORTED
BYPASS_READY
DOORBELL
START/CANCEL CMD
PARSING LOGIC (AUTO-ANSWERING)
220
COMPLETION
394
DOORBELL TO BYPASS ROUTE/PATH
BLOCK
PASS
392
COMPARISON CIRCUIT
OPCODE = START CMD
OR
OPCODE = CANCEL CMD
EN

CONTROLLER AND MEMORY SYSTEM INCLUDING A MAILBOX

CROSS-REFERENCE TO RELATED APPLICATIONS

This patent application claims the benefit of priority under 35 U.S.C. § 119 (a) to Korean Patent Application No. 10-2024-0055302, filed on Apr. 25, 2024, the entire disclosure of which is incorporated herein by reference.

TECHNICAL FIELD

Various embodiments of the present disclosure described herein relate to a memory system, and more particularly, to the memory system including a memory expander or a shred memory device coupled to at least one host.

BACKGROUND

Computing systems are increasing an amount of computation in response to user needs. As the amount of computation increases, an amount of data generated or stored is also increasing. While the amount of data is increasing, a storage space available to store data in computing systems is limited. A memory expander or a shared memory device can be used to store significant amounts of data and avoid degradation of computational power and performance of the computing systems. The memory expander or the shared memory device may be understood as a composable infrastructure to overcome resource limitations of the computing systems. When the computing systems and storage expandable devices perform high-speed data communication, a system may support computation of highly integrated workloads arising from big data and machine learning. The memory system may transmit a response to a request, input along with a limited operation time during data communication with a host, within a preset time.

BRIEF DESCRIPTION OF THE DRAWINGS

The description herein makes reference to the accompanying drawings wherein like reference numerals refer to like parts throughout the figures.

FIG. 6 describes mailbox configuration according to an embodiment of the present disclosure.

DETAILED DESCRIPTION

Figure 1:
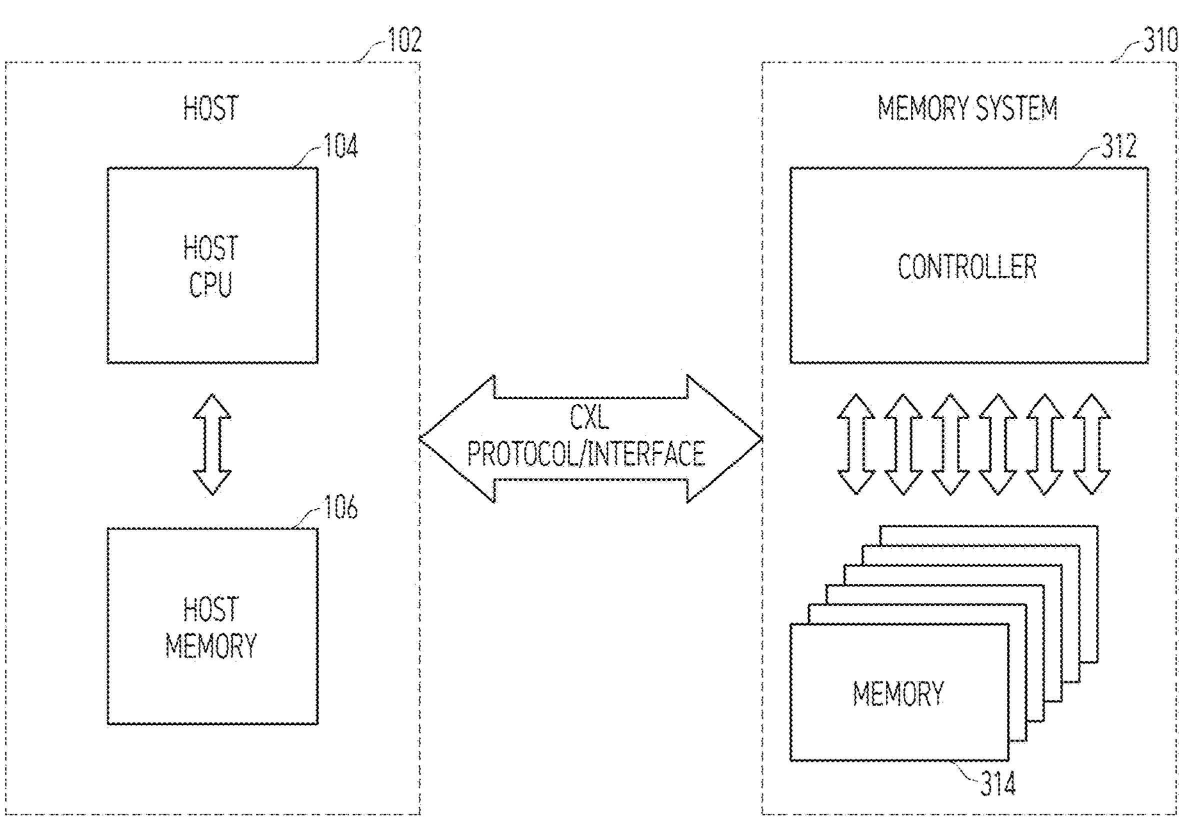
FIG. 1 describes a data processing apparatus in accordance with an embodiment of the present disclosure.

Various embodiments of the present disclosure are described below with reference to the accompanying drawings. In this disclosure, elements and features may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in a manner that is capable of performing the task(s) at issue. "Configured to" may also include adapting a manufacturing process, e.g., a semiconductor fabrication facility, to fabricate devices, e.g., integrated circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory (ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,' 'circuitry' or 'logic' also covers an implementation of merely a processor or multiple processors or a portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Embodiments of the present disclosure can provide an apparatus and a method for improving performance of computing systems including a host and a memory system including a memory expander or a shared memory device.

An embodiment of the present disclosure can provide a device and an operation method that allows a Compute Express Link (CXL) device to transfer a response within a preset time for a request associated with a response time restriction from a command input time during data communication between the host and the memory system.

Further, an embodiment of the present disclosure can provide a method and a device that allows the memory system to: perform an operation corresponding to a host command at a specific time point or under a specific operation condition; and generate an appropriate response to the host command.

In an embodiment of the present disclosure, a memory system can include at least one memory device; and a controller comprising at least one mailbox configured to receive a doorbell signal and to output an interrupt signal, a processor configured to process a mailbox command based on the interrupt signal, and at least one logic configured to perform a preset operation. The at least one mailbox is configured to: transfer, to the processor, the interrupt signal based on a first doorbell signal corresponding to a first command when receiving the first command input from a host; and transfer, to the at least one logic, a second doorbell signal corresponding to a second command when receiving the second command input from the host.

For the memory system, an operation code corresponding to the first command can be input to a command register. The first command can accompany an identifier used to specify a first logic among the at least one logic and an operation code corresponding to a logic command to be performed by the first logic, which are input to a payload register.

The at least one mailbox can be configured to generate a return code of 'busy' within 2 seconds after the first command is input, in response to the first command.

The controller can be configured to activate parsing circuitry included in the at least one mailbox, in response to the first command.

The parsing circuitry can be configured to couple a doorbell register to a bypass route, for transferring a doorbell signal input to the at least one mailbox to the first logic in response to the second command input from the host.

The first logic can be configured to transfer a response corresponding to the logic command accompanied by the first command to the at least one mailbox, in response to the doorbell signal.

The response can be transferred to the at least one mailbox. The parsing circuitry can be configured to block a connection between the doorbell register and the bypass route. The controller can be configured to release or interrupt the bypass route between the at least one mailbox and the first logic.

The parsing circuitry can be configured to block a connection between the doorbell register and the bypass route after transferring the doorbell signal a preset number of times. The controller can be configured to release or interrupt the bypass route between the at least one mailbox and the first logic when the connection between the doorbell register and the bypass route is blocked.

The controller can be configured to interrupt the bypass route between the at least one mailbox and the first logic when the parsing circuitry recognizes a third command input from the host.

The parsing circuitry can be inactivated based on the third command.

The parsing controller can be further configured to generate a return code of 'unsupported' in response to a command, input from the host after the second command, other than the third command.

For the memory system, operation codes corresponding to the second command and the third command can be input to a command register. Input payloads accompanied by the second command and the third command may be empty.

The controller can be configured to perform data input/output operations to the at least one memory device, regardless of the first command input to the at least one mailbox.

The at least one logic can be configured to perform detailed operations associated with data input/output operations within the controller or perform a background operation for the data input/output operations.

In another embodiment of the present disclosure, a controller can include at least one processor configured to execute a first command input from an external device; at least one logic configured to perform a preset operation; and a mailbox configured to transfer a doorbell signal to the at least one logic after transferring an interrupt signal corresponding to the first command to the at least one processor.

The first command can include an identifier used to specify a first logic among the at least one logic and an operation code corresponding to a logic command to be performed by the first logic.

The at least one processor can include a handler configured to process the interrupt signal. The at least one processor can be configured to set a bypass route coupling the first logic to the mailbox in response to the first command.

The bypass route can be exclusive for the first logic. The mailbox can be configured to respond to the external device with a return code of 'busy' in response to the first command.

The mailbox can include plural registers including a doorbell register, a command register, a return code register, and a payload register; and parsing circuitry configured to parse a second command and a third command input through the command register from the external device and determine whether to transfer the doorbell signal input through the doorbell register into the at least one logic.

The at least one processor can be configured to activate the parsing circuitry in response to the first command.

The parsing circuitry can be configured to: transfer the doorbell signal to the at least one logic in response to the second command; and block the doorbell signal from being transmitted to the at least one logic in response to the third command.

The mailbox can be configured to, in response to the third command, inactivate the parsing circuitry and respond to the external device with a return code of 'aborted'; and request a release of the bypass route to the at least one processor.

The parsing circuitry can be further configured to respond to the external device with a return code of 'unsupported' in response to a command other than the second command and the third command, after the first command is input to the mailbox.

The parsing circuitry can be inactivated when the at least one logic transfers a response associated with the first command to the mailbox in response to the doorbell signal.

In the controller, a response or a result to the first command is stored in a return code register or a payload register within 2 seconds after the first command is transferred to the mailbox.

These and other features and advantages of the invention will become apparent from the detailed description and the accompanying drawings of embodiments of the present disclosure. Embodiments will now be described with reference to the accompanying drawings, wherein like numbers reference like elements.

FIG. 1 describes a data processing apparatus in accordance with an embodiment of the present disclosure.

Referring to FIG. 1, the data processing device can include a host 102 and a memory system 310. The host 102 and the memory system 310 can communicate with each other through a Compute Express Link (CXL) protocol or a CXL interface.

The CXL protocol or the CXL interface can be used for providing an architectural solution that separates memory from computing nodes, such as memory disaggregation, which provides a dynamically scalable shared memory that overcomes large data processing performance and capacity limitations occurring in a conventional CPU-centric system. Due to explosive increase in data from emerging applications such as big data and artificial intelligence (AI), the data processing apparatus including computing devices may require a large-capacity high-bandwidth memory. The memory system 310 configured to communicate with the host 102 through the CXL protocol or CXL interface can support the large-capacity high-bandwidth memory. For example, unlike a host memory 106 which relies entirely on a host central processing unit (CPU) 104, the host 102 can store or add additional values, such as a data processing engine, in the memory system 310 or the CXL memory device 314 through handshaking communication based on the CXL protocol or CXL interface.

The host 102 includes the host CPU 104 and a host memory 106. The number and configuration of the host CPU 104 and host memory 106 can vary depending on performance, operation requirements, operation speed, data input/output speed, etc. of the host 102. The host CPU 104 and the host memory 106 can transmit and receive data through mutually predetermined protocols. Examples of predetermined protocols for transmitting and receiving data can include Universal Serial Bus (USB), Multi-Media Card (MMC), Parallel Advanced Technology Attachment (PATA), Small Computer System Interface (SCSI), and Enhanced Small Disk Interface (ESDI). There are various interface protocols such as Integrated Drive Electronics (IDE), Peripheral Component Interconnect Express (PCIe), Serial-attached SCSI (SAS), Serial Advanced Technology Attachment (SATA), and Mobile Industry Processor Interface (MIPI). According to an embodiment, the host 102 and the host memory 106 may be connected through a universal serial bus (USB). The universal serial bus (USB) may include a highly scalable, hot-pluggable, plug-and-play serial interface that provides standard, cost-effective connectivity to peripherals such as keyboards, mice, joysticks, printers, scanners, storage devices, modems, video conferencing cameras, and more.

Unlike data communication between the host CPU 104 and the host memory 106 in the host 102, the host 102 and the memory system 310 can communicate with each other through the CXL protocol or the CXL interface. The Compute Express Link (CXL) is a type of interface which can be provided for data communication between peripheral devices and CPU in a computer system based on the Peripheral Component Interconnect Express (PCIe). Unlike the PCIe which was designed as a standard for general input/output devices, the CXL is a specialized interface for memory access and high-speed data transfer in a high-performance computing environment. For example, the PCIe uses one-way communication, while the CXL can support two-way communication. Because the CXL is designed to maintain backward compatibility with the PCIe, a communication environment between the host 102 and the memory system 310 could be implemented by utilizing a conventional PCIe infrastructure.

Distributing the CXL memory device 314 to the host CPU 104 may have limited interface bandwidth, as compared to the host memory 106. To overcome this, according to an embodiment, the memory system 310 can include a core or a processor for near data processing (NDP). The near data processing (NDP) is a computing paradigm to increase data processing efficiency. The near data processing (NDP) is based on a configuration that places a processor that processes data close to a data storage or a memory, such as the CXL memory device 314.

In a conventional computing model, the host CPU 104 may try to retrieve data from the connected CXL memory device 314 to expand the host memory 106, process the data, and store a result back in the CXL memory device 314. However, this scheme in the conventional computing model may cause a bottleneck in a bandwidth between the CXL memory device 314 and the host CPU 104 in an application that should process large amounts of data. In order to solve this problem, the near data processing (NDP) can place a controller 312, which is a processor that processes data, close or adjacent to the CXL memory device 314 where the data is stored. That is, instead of a scheme moving or transferring data from the CXL memory device 314 to the host CPU 104, the controller 312, which is a processor to perform data processing, can be included in the memory system 310 where the data is located. This configuration can significantly reduce latency and energy consumption due to data movement. For example, the controller 312 can be used as a controller used in a CXL device.

Unlike the memory system 310, the host memory 106 is used for in-memory processing of the host CPU 104. In-memory processing, the host memory 106 can store as much data as possible and reduce latency due to disk I/O. These features can provide high performance in database operations, real-time analysis, etc., but the host memory 106 is expensive and has limited capacity, so there may be limitations in processing very large data sets. Accordingly, the data processing apparatus can overcome the limitations in operation and performance of the host memory 106 through the memory system 310 including the controller 312 for near data processing (NDP).

Figure 2:
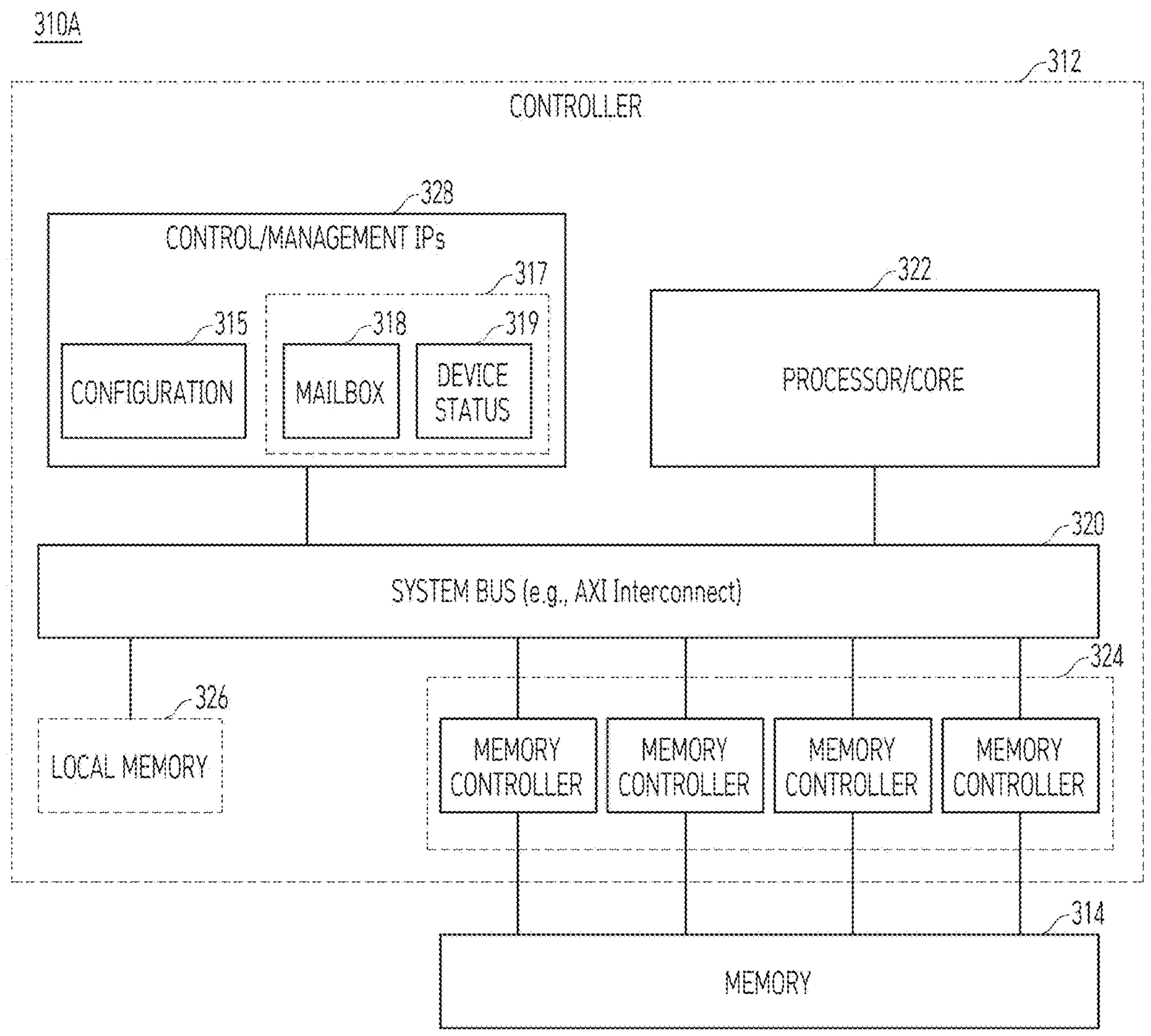
FIG. 2 describes a memory system in accordance with an embodiment of the present disclosure.

FIG. 2 describes a memory system in accordance with an embodiment of the present disclosure Referring to FIG. 2, a memory system 310A can include a controller 312 and a CXL memory device 314. According to an embodiment, the controller 312 and the CXL memory device 314 in the memory system 310A can be arranged to be physically separate from each other, or can be integrated and implemented as a single chip.

According to an embodiment, the controller 312 can include a processor or core 322, a system bus 320, and at least one memory controller 324.

According to an embodiment, the controller 312 can include a separate local memory 326.

Internal configuration of the controller 312 and the memory system 310A can vary depending on operating performance required for, or guaranteed by, the memory system 310A. For example, a control or management IP logic 328 and a processor or core 322 in the memory system 310A can be integrated and implemented as a single module. The control or management IP logic 328 can include a plurality of control or management IPs 328. Herein, an IP (Intellectual Property) or a semiconductor IP (SIP) can refer to intellectual property blocks or pre-designed and pre-verified components used in creation of semiconductor chips or integrated circuits (ICs). Additionally, the controller 312 can include the plurality of control or management IPs 328 or a plurality of processors or cores 322. Furthermore, at least one memory controller 324 can include four memory controllers, but the number of memory controllers can be designed to be 2, 8, or 16, etc. According to an embodiment, the number of memory controllers is set to 3 or 5, and at least one memory controller 324 is individually employed according to the characteristics, purpose of use, frequency of use, etc. of data stored in the CXL memory device 314. The CXL memory device 314 can include a plurality of memory groups including a plurality of memory cells. Each memory group can have a form of a physically distinct memory die or memory chip or can be arranged in multiple areas within one chip. Additionally, the CXL memory device 314 can include at least one of a memory group including a plurality of non-volatile memory cells, a memory group including a plurality of volatile memory cells, and a memory group including both a plurality of volatile memory cells and a plurality of non-volatile memory cells. For example, the CXL memory device 314 can include DDR5, HBM, PCRAM, etc.

The control or management IP logic 328 in the memory system 310A can support data communication with the host 102 through the CXL protocol or the CXL interface. The control or management IP logic 328 can support the memory system 310A to communicate as a CXL endpoint. For example, the control or management IP logic 328 can perform functions such as event communication, data buffering, and command delivery. The processor or core 322 can support plural operations such as processing instructions or command or performing data communication between components within the memory system 310. According to an embodiment, the processor or core 322 can include a near data processing (NDP) engine to overcome bandwidth limitations between the host 102 and the memory system 310A. At least one memory controller 324 receives a command from the control or management IP logic 328 or the processor or core 322 and controls an operation, corresponding to the command, performed within the CXL memory device 314. In the CXL memory device 314, operations such as reading, writing, and erasing data can be performed by the at least one memory controller 324.

The system bus 320 can provide a path for communication between components within the memory system 310A. An example of the system bus 320 is Advanced extensible Interface (AXI). The AXI is one of the point-to-point interconnect protocols for communication between various components within the controller 312, such as processors, memory interfaces, IP logics, and peripherals. The AXI can be designed to address the needs of high-performance, high-frequency system designs and can be used in the controller 312 to facilitate communication between various IP cores or modules, such as processors, memory controllers, and peripherals. The AXI can form a part of the broader ARM Advanced Microcontroller Bus Architecture (AMBA), which includes other protocols such as Advanced High-performance Bus (AHB) and Advanced Peripheral Bus (APB). The AXI can improve overall system performance by enabling high throughput communication, low latency, and efficient data transfer between plural components within the controller 312. Further, the AXI can support command pipelining, which can reduce latency and increase data transfer efficiency. This functionality can allow plural components within controller 312 to send multiple requests, such as a second request, without waiting for a response to a first request transferred before the second request. Also, the AXI can have characteristics of improving interconnection throughput and utilization by allowing transactions to be completed out-of-order.

Further, the AXI can support burst transactions, allowing efficient transfer of large, continuous data. The AXI protocol can separate a read channel and a write channel from each other, allowing simultaneous read and write operations and improving transaction concurrency. The AXI can support flexible data widths and multiple high-performance transactions, providing separate channels for read and write transactions and enabling efficient data transfer with low latency. The AXI may be suitable for enabling high-speed data transfers, pipelined operations and enabling multiple concurrent accesses on shared resources.

Referring to FIG. 2, an embodiment of a data input/output operation performed in the memory system 310A will be briefly described. When the host 102 transmits a data input/output command to the memory system 310A, the data input/output command can be transmitted to the processor or core 322 through the control or management IP logic 328. The processor or core 322 can decode or read data corresponding to the data input/output command. Depending on the read result, the processor or core 322 can perform the near data processing (NDP). Further, the processor or core 322 can use at least one memory controller 324 to secure data from the memory device or store data in the CXL memory device 314. Further, data input/output results or results of performing the near data processing (NDP) can be transmitted to the host 102 (see FIG. 1) through the control or management IP logic 328.

The control or management IP logic 328 may be implemented with at least one circuit or logic. The control or management IP logic 328 can set, manage, or control at least one register 315, 317. The at least one register 315, 317 can include configuration space registers 315 and memory mapped registers 317. The memory mapped registers 317 can include a mailbox register 318 and a device status register 319. The control or management IP logic 328 can include a register interface (e.g., a Register Interface 368 in FIG. 3) for setting, managing, or controlling the at least one register 315, 317.

The configuration space registers 315 can include plural registers configured to be used to set an operating mode of the memory system or the memory device. The configuration space registers 315 can provide initial configuration settings when the memory system 310 boots and affect how the processor or core 322 or another hardware component (e.g., the control or management IP logic 328) operates. For example, information such as which component the memory system 310 will boot through during a booting process and what clock speed of the memory system 310 will be set to may be included here.

The memory mapping register 317 can set or assign a specific address in the space within the local memory 326 so that a specific component can use an assigned address. For example, the processor or core 322 or another hardware component (e.g., the control or management IP logic 328) can utilize a memory space or a storage area in the local memory 326 through the assigned address. For example, a mailbox logic (e.g., blocks 316A, 316B in FIGS. 5 and 6) included in the control or management IP logic 328 can use assigned addresses to access the memory space or the storage area which can be specified by the mailbox register 318.

Figure 3:
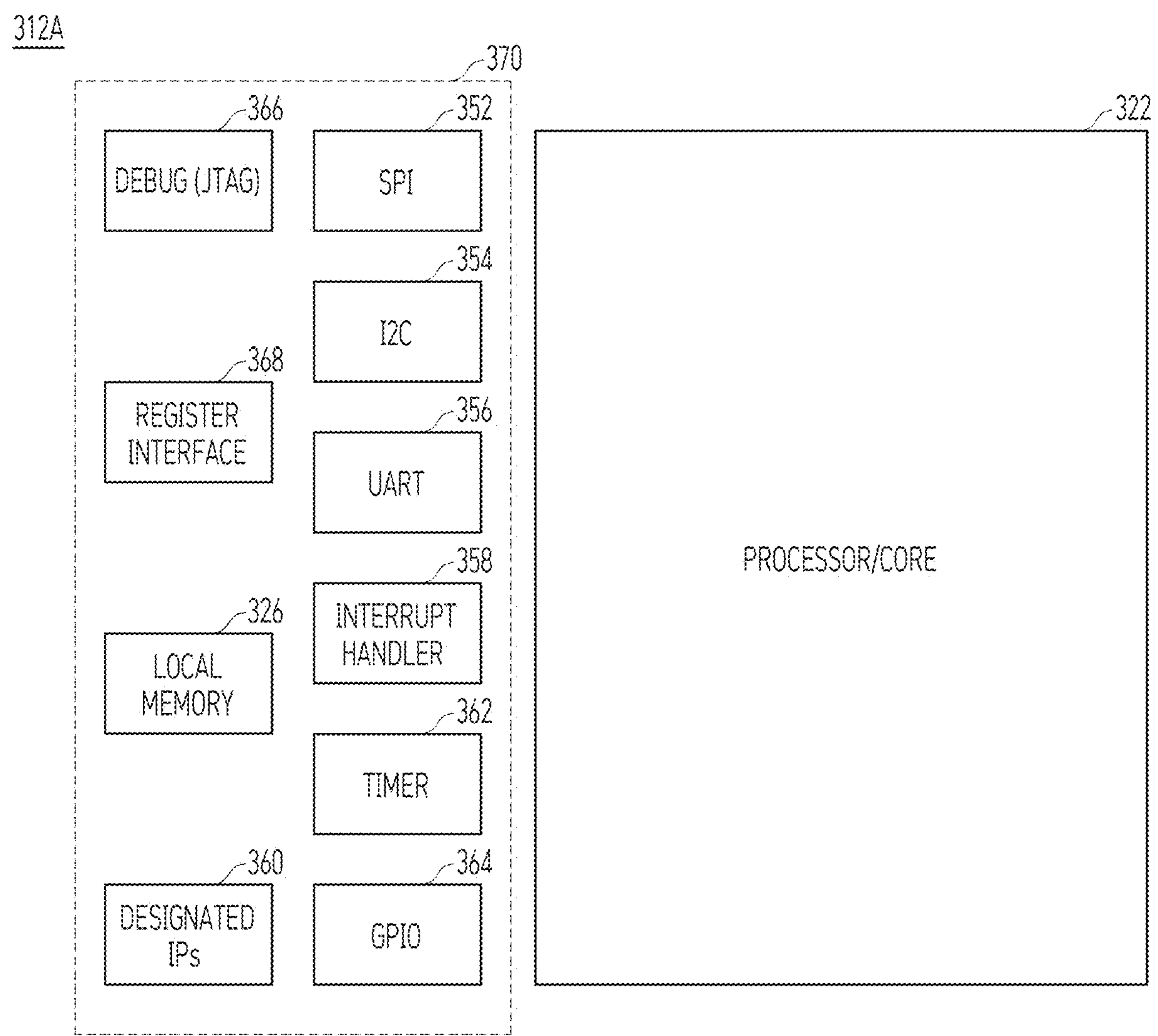
FIG. 3 describes a controller according to another embodiment of the present disclosure.

FIG. 3 describes a controller according to another embodiment of the present disclosure.

Referring to FIG. 3, the controller 312A can include a processor or core 322, at least one logic 370. Here, the at least one logic 370 can include data communication circuits 352, 354, 356, 364 capable of supporting multiple communication protocols or interfaces, an interrupt handler 358, a timer 362, a local memory 326, a hardware debugging circuit (DEBUG (JTAG)) 366, and an IP circuit or IPs 360 designed for performing a specific predetermined operation. According to an embodiment, the control or management IP logic 328 described in FIG. 2 can be included in the at least one logic 370 described in FIG. 3. The hardware debugging circuit 366 can be used to diagnose an error or a status or debug hardware and software issues/problems of embedded systems and integrated circuits. For example, the hardware debugging circuit 366 can provide a tool or a device to halt or cease an operation of the processor or core 322, examine contents contained in the local memory 326, or control the execution of codes step by step.

The processor or core 322 can support 32-bit or 64-bit general purpose registers, virtual memory management, and cache software. Further, the processor or core 322 can communicate through the data communication circuits 352, 354, 356, 364 which are capable of supporting at least one of multiple communication interfaces including an AXI interface (e.g., a system bus 320). According to an embodiment, the processor or core 322 used as the microprocessor can be a Reduced Instruction Set Computer (RISC) which is optimized for implementation of a Field Programmable Gate Array (FPGA). For example, the processor or core 322 can be configured to include 32 of 32-bit or 64-bit general purpose registers, a 32-bit instruction word with three operands and two addressing modes, a basic 32-bit address bus (expandable to 64 bits), and a single issue pipeline, and the like.

The data communication circuits 352, 354, 356, 364 connected to the processor or core 322 can support communication interfaces having different functions and purposes. For example, the Serial Peripheral Interface (SPI) circuit 352, which is one of the data communication circuits 352, 354, 356, 364, can support an interface for high-speed synchronous serial communication. The SPI can have a master and slave structure. The SPI can use a separate chip select signal (Chip Select, CS) for connection with multiple components within the memory system 310A.

Further, the Inter-Integrated Circuit (I2C) 354 among the data communication circuits 352, 354, 356, 364 can communicate according to the serial communication protocol. The I2C 354 can be used to couple multiple master devices to multiple slave devices, and each device could be distinguished through addressing. The I2C 354 can have a slower data transmission speed than the SPI circuit 352, but could be implemented with only two signal lines.

The Universal Asynchronous Receiver/Transmitter (UART) circuit 356 among the data communication circuits 352, 354, 356, 364 can provide an interface for asynchronous serial communication. The UART can convert parallel data into serial data and transmit the serial data, and the receiving side can convert the serial data back into the parallel data. The UART can provide stable data transmission while minimizing hardware overheads.

The General-Purpose Input/Output (GPIO) circuit 364, which is one of the data communication circuits 352, 354, 356, 364, can provide an interface for the processor or core 322 to interact with an external device. The GPIO pin can be set to an input or output mode, and the GPIO circuit 364 can be used to process various digital signals.

Figure 5:
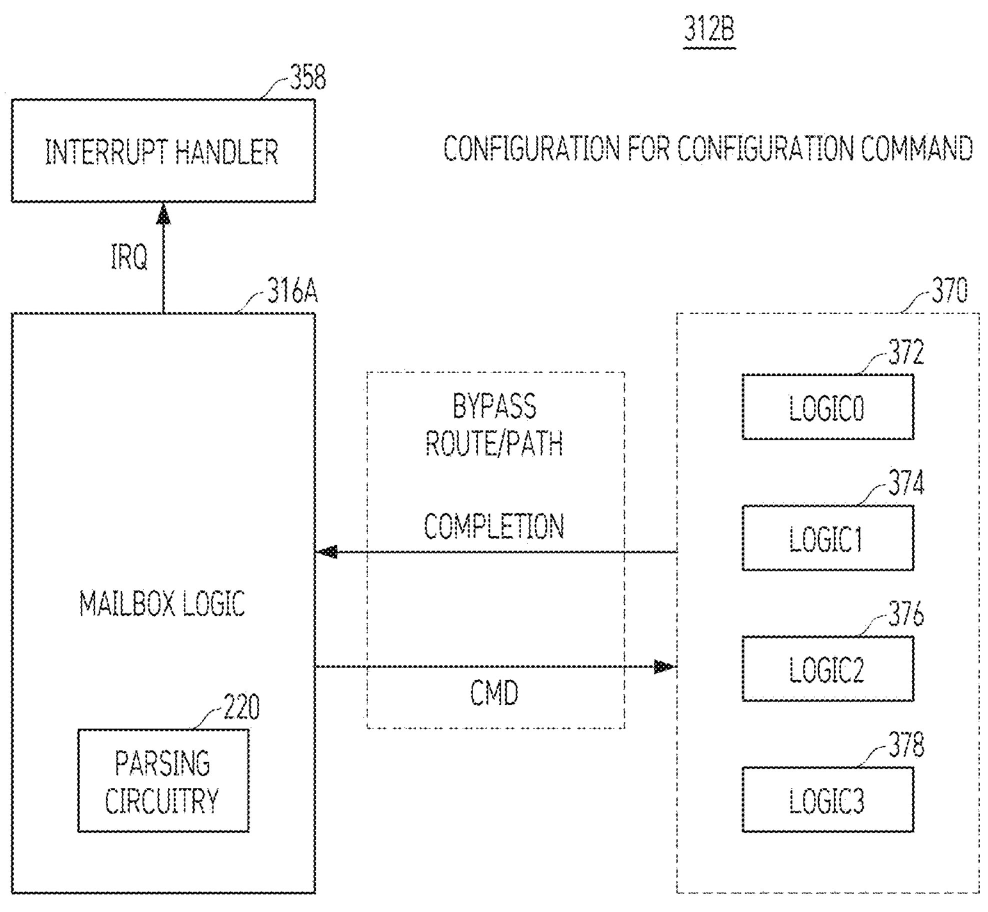
FIG. 5 describes a memory system, including a mailbox and plural logics coupled to each other, according to an embodiment of the present disclosure.

The controller 312A or the processor or core 322 can include an interrupt handler 358. The interrupt handler 358 can support efficient operation of a memory system including a plurality of components. For example, the mailbox logic (e.g., blocks 316A, 316B of FIGS. 5 and 6) can process an interrupt request or signal (IRQ) transmitted to the processor or core 322 in response to a value (e.g., opcode) input to the mailbox register (318). Referring to FIGS. 3 and 5, the interrupt request IRQ can be used to notify the processor or core 322 that a specific event (e.g., data preparation, error occurrence, etc.) has occurred in various components included in the memory system 310A. The interrupt request (IRQ) can notify the processor or core 322 to suspend a current processing task and immediately process the event corresponding to the interrupt request (IRQ).

According to an embodiment, the interrupt handler 358 can be executed as a part of an operating system to process a specific interrupt. In response to the interrupt request (IRQ), the interrupt handler 358 can determine a cause of the interrupt, take an appropriate action, and then notify the processor or core 322 that the task can be resumed. In this manner, the processor or core 322 can quickly and efficiently process an event occurring in various devices or components.

The register interface 368 can perform register mapping to designate a specific address of the local memory 326 to the at least one register 315, 317, so that a storage area or space in the local memory 326 could work as a register. The register interface 368 can perform data reading to read a value of the register or data writing to write a value in the register, using a mapped memory address. The register interface 368 can perform circuit/logic control and status monitoring to initialize a specific circuit or logic, control the operation of the circuit or logic, or monitor a status of the circuit or logic. The register interface 368 can perform interrupt processing to notify the processor or core 322 when a specific event occurs.

The IP circuit 360 designed for a specific operation can be designed to efficiently perform data input/output operations of the memory system 310 or background operations to support data input/output operations. Depending on operating performance of the memory system 310, the number and configuration of the IP circuit 360 included in the controller 312A may vary.

Figure 4:
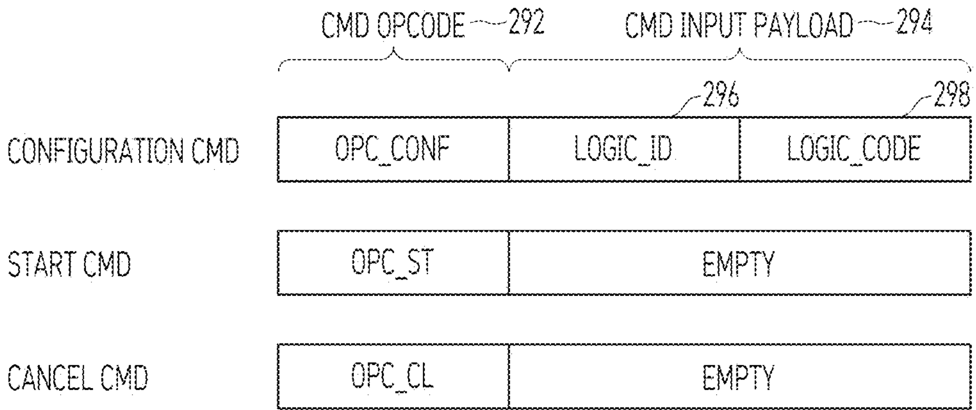
FIG. 4 describes command configuration according to an embodiment of the present disclosure.

FIG. 4 describes command configuration according to an embodiment of the present disclosure.

Referring to FIG. 4, the host 102 and the memory system 310 can use first to third commands set or configured to support the CXL protocol or CXL interface. For example, the first command can be a configuration command (CONFIGURATION CMD), the second command can be a start command (START CMD), and the third command can be a cancel command (CANCEL CMD).

The first to third commands can have a data structure including two areas 292, 294. The two areas 292, 294 can include a command code area (CMD OPCODE) 292 including a command or an operation code, and an input payload (CMD INPUT PAYLOAD) 294 that may specify the command code area 292 or include option(s) corresponding to the command or the operation code included in the command code area 292.

For example, the first command can include a preset code value (OPC_CONF) corresponding to the configuration command in the command code area 292 and an identifier (LOGIC_ID) 296 and a code value (LOGIC_CODE) 298 in the input payload 294. The identifier can point to at least one logic. The code value (LOGIC_CODE) 298 can indicate an operation to be performed in the at least one logic corresponding to the identifier 296. The memory system 310 and the host 102 can share the identifier 296 that points to the at least one logic which is a component included in the memory system 310. Further, the memory system 310 and the host 102 can share an operation to be performed in the at least one logic. The host 102 can add or write at least one of shared identifiers and at least one of shared values indicating operations performed by the at least one logic to the input payload 294 of the first command. The host 102 can transmit the first command along with the identifier 296 and the code value 298 to the memory system 310. In response to the first command input from the host 102, the memory system 310 can transfer the code value 298 to an internal component corresponding to the identifier 296 for preparing to deliver a result requested by the host 102.

The second and third commands can include preset code values in the command code area 292, which correspond to the start command and the cancel command. But the input payload 294 corresponding to the second and third commands may be empty (EMPTY). The second and third commands can be used to determine whether to perform an operation prepared by the memory system 310 based on the first command, so that the second and third commands might not need to include additional values in the input payload 294.

Hereinafter, specific operations corresponding to the first and third commands will be described with reference to FIGS. 5 to 11.

FIG. 5 describes a memory system, including a mailbox and plural logics coupled to each other, according to an embodiment of the present disclosure.

Referring to FIG. 5, a controller 312B can include a mailbox logic 316A, an interrupt handler 358, and at least one logic 370. The at least one logic 370 can include a plurality of logics 372, 374, 376, 378. Here, the at least one logic 370 can include at least some of the plurality of components included in the control or management IP logic 328 described in FIG. 2 or the at least one logic 370 described in FIG. 3.

The mailbox logic 316A within the memory system 310 can provide a communication mechanism between components within the controller 312B. For example, the mailbox logic 316A can notify the processor or core 322 of an event occurring in a component (e.g., data preparation, error occurrence, etc.). Event information is stored in the mailbox registers 318. The processor or core 322 can check the mailbox registers 318 and respond appropriately. Further, the mailbox registers 318 can serve as a buffer that temporarily stores generated data or input data in the memory system 310A. When the processor or core 322 is ready to process the data, the data could be transferred from the mailbox registers 318 to the processor or core 322. Furthermore, the processor or core 322 can transmit a command to a component in the memory system 310A through the mailbox registers 318. Such a command can be stored in the mailbox registers 318. Corresponding components can read the mailbox registers 318 and execute a read value (e.g., perform an operation corresponding to the read value). According to an embodiment, the mailbox logic 316A can include at least some of the register interface 368 described in FIG. 3.

For example, when a command is input to the mailbox register 318 in the memory system 310, the mailbox logic 316A can transmit the interrupt request IRQ to the processor or core 322 through the interrupt handler 358. The interrupt request IRQ can be understood as a signal that a hardware component or device in the system uses to notify the processor or core 322 of an event (e.g., data is ready or an error has occurred). When a command is input to the memory system 310, the mailbox logic 316A can notify the processor or core 322 of the occurrence of an event for the command through the interrupt handler 358. The mechanism by which the mailbox logic 316A transmits the interrupt request IRQ can vary depending on implementations of the processor or core 322 and the mailbox logic 316A, firmware, and/or an interrupt handling method of the operating system.

In response to the first command (CONFIGURATION COMMAND), the controller 312B can set a bypass route/path coupling the mailbox logic 316A to the at least one logic 370. The bypass route/path can electrically directly couple the mailbox logic 316A to the at least one logic 370 by bypassing the processor or core 322. The bypass route/path can be configured in various forms. For example, the bypass route/path can include a first line for transmitting a command CMD or a code OPCODE from the mailbox logic 316A to the at least one logic 370 and a second line for transmitting a completion (COMPLETION) or a response from the at least one logic 370 to the mailbox logic 316A. For example, the at least one logic 370 can include plural lines that individually connects the mailbox logic 316A and each logic 372, 374, 376, 378 within the at least one logic 370, or may include a multiplexer to reduce complexity due to the plural lines. Alternatively, the bypass route/path can be established using the system bus 320 described in FIG. 2.

FIG. 5 describes an embodiment in which the bypass route/path includes plural lines individually implemented according to the transmission direction of data or signals.

But, according to another embodiment, the bypass route/path may be configured as a single line that performs bidirectional communication.

Through the identifier (296, see FIG. 4) included in the first command (CONFIGURATION COMMAND), the controller 312B can select one of the plurality of logics 372, 374, 376, 378 included in the at least one logic 370. The controller 312B can set a bypass route/path connecting the selected logic to the mailbox logic 316A. Here, the bypass route can be exclusive and independent. For example, the data input/output operation using the CXL memory device 314 in the memory system 310 and a mailbox-related operation performed through the mailbox logic 316A can be performed independently of each other. The bypass route/path connecting the selected logic and the mailbox logic 316A can be performed separately from the data input/output operation using the CXL memory device 314.

Referring to FIGS. 4 and 5, the mailbox logic 316A can be selectively connected to a plurality of logics 372, 374, 376, 378 and an interrupt handler 358 within the controller 312B. The mailbox logic 316A can operate in a first operation mode in which the mailbox logic 316A transmits the interrupt request IRQ to the interrupt handler 358 in response to a doorbell signal input to a doorbell register (e.g., a doorbell register 232 shown in FIGS. 6 and 7). In addition, the mailbox logic 316A can operate in a second operation mode in which the mailbox logic 316A transmits the doorbell signal input to the doorbell register to one of a plurality of logics 372, 374, 376, 378, which is connected through the bypass route/path. To this end, the mailbox logic 316A can include a logic or circuitry (e.g., parsing circuitry 220) that can parse a command input from the host 102 to determine transmission of the doorbell signal input to the doorbell register. The mailbox logic 316A can operate in different operation modes depending on whether the logic or circuitry operates (e.g., be activated or inactivated).

Depending on the operation mode, the mailbox logic 316A can process a command input from the host 102 in different ways. For example, in the first operation mode, the mailbox logic 316A can transmit the interrupt request IRQ, corresponding to the doorbell signal input to the doorbell register, to the interrupt handler 358. For example, the host 102 can store the first command (CONFIGURATION COMMAND) in the mailbox register 318 and input the doorbell signal. The mailbox logic 316A can transmit the interrupt request (IRQ) to the interrupt handler 358, in response to the doorbell signal, and cause the processor or core 322 to check or recognize the first command (CONFIGURATION COMMAND). The controller 312B or the processor or core 322 can perform an operation corresponding to the first command (CONFIGURATION COMMAND) and then respond (e.g., generate a result or a return code). Herein, because the first command (CONFIGURATION COMMAND) is a type of mailbox command, the controller 312B can generate a response or a return code to the first command (CONFIGURATION COMMAND) within 2 seconds after the first command (CONFIGURATION COMMAND) is input.

According to an embodiment, when the response to the first command is not processed within 2 seconds, the host 102 may attempt an operation to recover the memory system 310. For example, the host 102 can transmit a command to the memory system 310 to set or reset the CXL interface to hot, warm, cold, or the like.

Further, in the second operation mode, the mailbox logic 316A can transmit the doorbell signal input to the doorbell register through the bypass route. One of the plurality of logics 372, 374, 376, 378 selected by the first command can generate or transmit a response or a result for the logic code area 298 included in the first command to the mailbox logic 316A in response to the doorbell signal.

The response to the command transmitted through the mailbox register 318 and the mailbox logic 316A can be made within 2 seconds. However, the time of 2 seconds can be a significant amount of time considering the data input/output operations performed within the memory system 310. For example, an operational status of the memory system 310, the controller 312B, or another component within the memory system 310 can be changed frequently during the time of 2 seconds. Therefore, it might be difficult for the host 102 to accurately determine or recognize an operation performed within the memory system 310, a status of the logic or component, etc. through the response to a command transmitted through the mailbox logic 316A in the first operational mode. However, in the second operational mode, the doorbell signal input from the host 102 can be transmitted through the bypass path to a specific logic already selected in response to the first command, and the selected logic can output a response within a short time (e.g., 1 second or dozens to hundreds hundred nanoseconds (ns) or microseconds (μs)) in response to the doorbell signal input from the host 102. The response corresponding to the doorbell signal may be made within a shorter time than the response to the first command. Based on this mechanism, the host 102 can more accurately determine an operational status within the memory system 310. The accurate operation status can be used for debugging or testing an operation to correct or improve an error in a transaction with, or the operation performed within, the memory system 310.

The host 102 can desire to recognize information (e.g., operation status, operation range, etc.) within the memory system 310 at a specific point in time or under a specific operation condition. For example, if the memory system 310 includes a Near Data Processing (NDP) engine, the host 102 can request more detailed information regarding operations processed by the memory system 310 in order to verify or double check an operation result output from the memory system 310. In this case, the host 102 can check information regarding the components within the memory system 310 in the second operation mode set by the first command.

Hereinafter, the operation of the mailbox in the memory system 310 will be specifically described based on the specific configuration within the mailbox logic 316A, 316B, 316C and the mailbox register 318.

Figure 6:
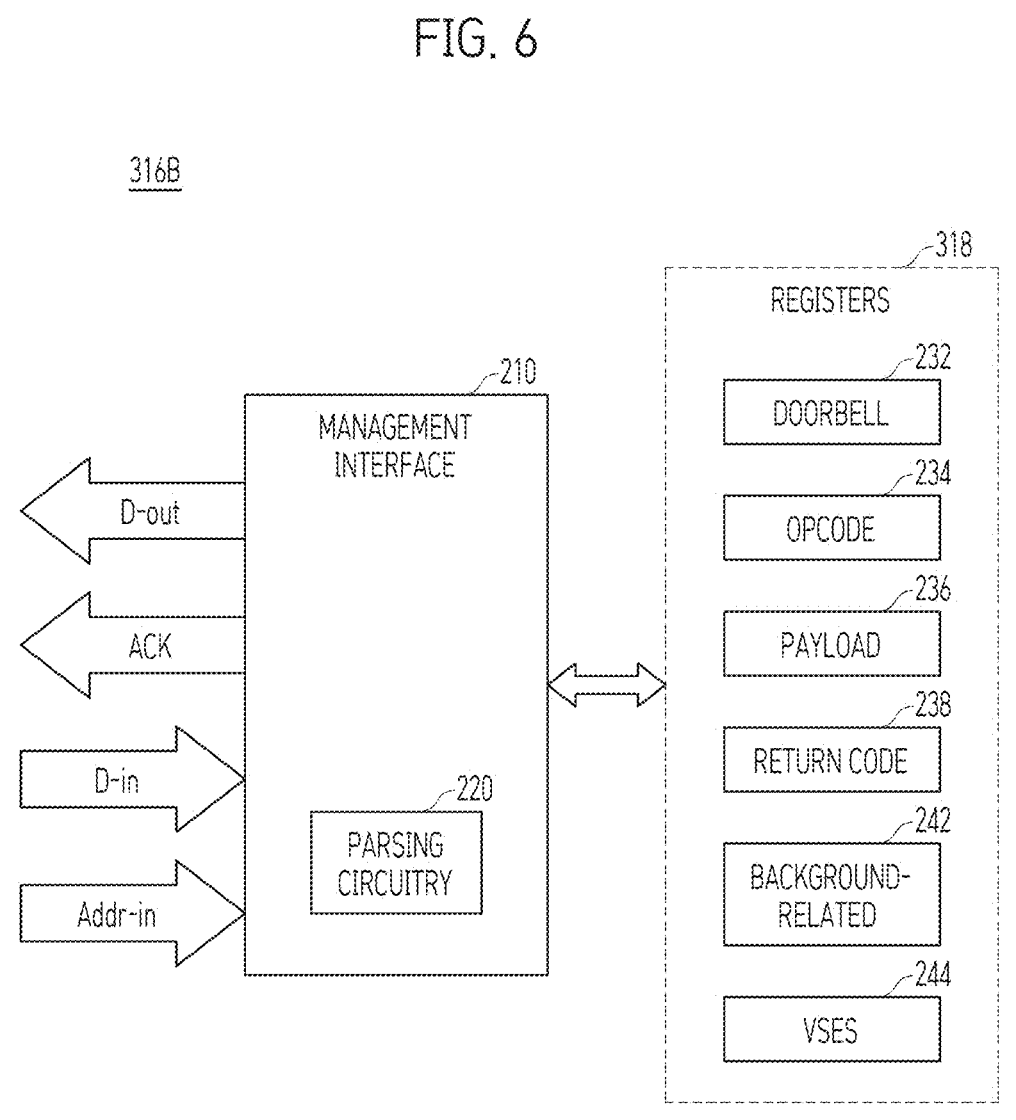

FIG. 6 describes mailbox configuration according to an embodiment of the present disclosure.

Referring to FIG. 6, the mailbox logic 316B can include a management interface 210 and mailbox registers 318. The mailbox registers 318 can include a plurality of individual separate spaces (e.g., a plurality of registers) configured to store various information, data, or signals. The management interface 210 can write information to, or output information in, the corresponding register according to a mailbox mechanism in response to an access (e.g., read/write) to specific information, data, or signals input along with an address indicating each individual space (e.g., each register) between the host 102 and the memory system 310. In addition, according to an embodiment, the management interface 210 can reset, erase or write information, data, or signals in the mailbox registers 318 based on the mailbox mechanism, the mailbox command, or an operation and a response to the command.

The mailbox registers 318 can include at least one register which is set by the memory system 310 for a mailbox operation and operably shared with the host 102. The mailbox operation can be distinguished from the data input/output operation performed by the memory system 310. The mailbox is an interface mainly used for configuring, managing, and exchanging status information of the memory system 310. For example, the mailbox command can be used to change the configuration of the memory system 310, request diagnostic information, or perform tasks such as firmware updates. The operating system or driver in the host 102 can transfer, through the mailbox, a control command to the memory system 310 or a command for inquiring status information of the logic or device of the memory system 310.

The mailbox registers 318 can include a doorbell register (DOORBELL) 232, a command code register (OPCODE) 234, a payload register (PAYLOAD) 236, a return code register (RETURN CODE) 238, a background operation-related register (BACKGROUND-RELATED) 242, and another register (VSES) 244 that can be additionally set by a user or a manufacturer. The specific details of the mailbox registers 318 will be described later with reference to FIG. 7.

Referring to FIG. 6, the management interface 210 in the mailbox logic 316B can receive input data D-in and an address Addr-in. In addition, the management interface 210 can output data D-out or transmit a response ACK to an external device such as the host 102. For example, the response ACK can be used for transferring a value stored in the return code register 238 to the external device. The management interface 210 can perform an operation of writing data or a specific value to the mailbox registers 318 or outputting data or a specific value stored in the mailbox registers 318. In addition, according to an embodiment, the management interface 210 can establish, set, or add a new register in the mailbox registers 318 or release, reset, or delete an unnecessary or unused register in response to a request from the memory system 310, the controller 312, or the host 102.

For example, if the host 102 wants to store a specific value (e.g., a bit value) in the doorbell register 232, the management interface 210 can change the stored value (i.e., the doorbell signal) of the doorbell register 232 in response to a request of the host 102. Thereafter, in the first operation mode, the management interface 210 can generate the interrupt request IRQ in response to the stored value (i.e., the doorbell signal) in the doorbell register 232 (see FIG. 5). In addition, in the second operation mode, the management interface 210 can support transmission of the value (i.e., the doorbell signal) stored in the doorbell register 232 through the bypass path in response to a request of the parsing circuitry 220.

The parsing circuitry 220 in the management interface 210 can determine transmission of the doorbell signal through the bypass path by checking a specific command (e.g., the second command and the third command shown in FIG. 4) stored in the command code register 234. In response to the first command input from the host 102, the controller 312 can activate the parsing circuitry 220 in the mailbox logic 316B. When the second command is input after the first command is processed, the parsing circuitry 220 can control the doorbell signal to be transmitted through the bypass path. On the other hand, if the third command is input after the first command is transmitted, the parsing circuitry 220 can block the doorbell signal from being transmitted through the bypass path.

If the command input from the host 102 (i.e., the command stored in the command code register 234) after the first command is transmitted is any command other than the second command or the third command, the parsing circuitry 220 can store a return code of 'unsupported' in the return code register 238. The specific configuration and operation of the parsing circuitry 220 will be described later with reference to FIGS. 8 to 11.

Figure 7:
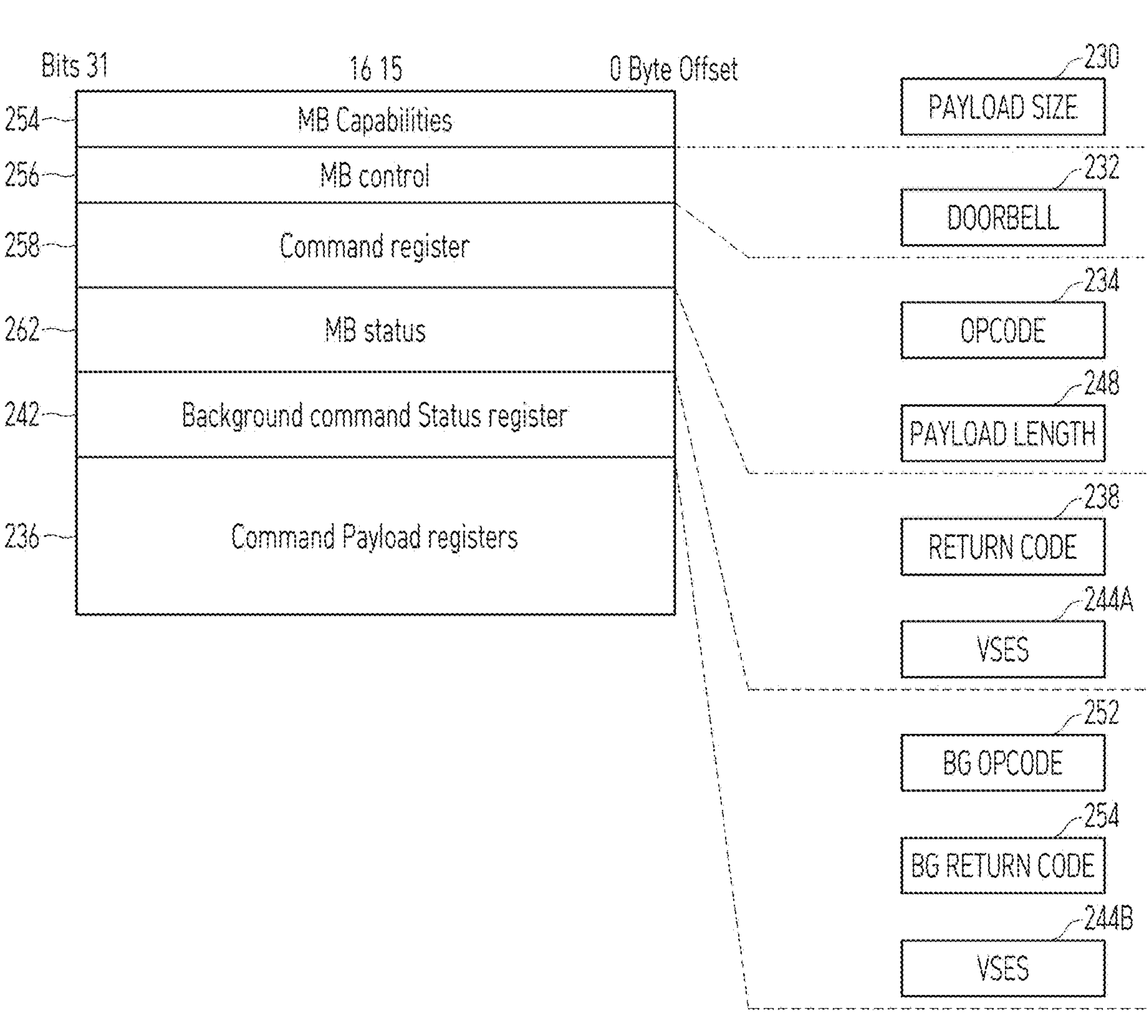
FIG. 7 describes mailbox registers according to an embodiment of the present disclosure.

FIG. 7 describes mailbox registers according to an embodiment of the present disclosure.

Referring to FIG. 7, the mailbox registers 318 can include a plurality of registers. Each of the plurality of registers in the mailbox registers 318 can be used as a means for exchanging information according to a preset purpose and be differently set with permission of READ/WRITE (e.g., READ only, WRITE only, READ/WRITE Allowed, etc.) for the host 102 or the memory system 310. Stored information and read/write permission regarding the plurality of registers included in the mailbox registers 318 can be operably shared by the host 102 and the memory system 310.

According to an embodiment, in the first operation mode, the mailbox command can be handled and carried out based on a following mailbox mechanism. The host 102 can read a mailbox control register 256 and check whether the value (e.g., a doorbell signal) in the doorbell register 232 is erased. The host 102 can write a command to the command code register 234 in the command register 258. If the Input Payload is not empty in relation to the command written in the command code register 234 (e.g., the first command shown in FIG. 4), the host 102 can write additional information, tag, identifier, etc. in the command payload register 236. Thereafter, the host 102 can write the mailbox control register 256 to input a doorbell signal to the doorbell register 232 (e.g., set the doorbell).

The host 102 can wait until the doorbell signal is cleared in the doorbell Register 232. Once the doorbell signal is cleared in the doorbell Register 232, the host 102 can read the mailbox status register 262 to retrieve the response (e.g., a return code) stored in the return code register 238. When the host 102 determines that a previously transmitted command was successfully processed based on a checked return code, the host 102 can read the command register 258. The host 102 can check the payload length register (PAYLOAD LENGTH) 248 in the command register 258 to recognize a length of the payload corresponding to the success of the previously transmitted command. If an output payload length is not '0' (i.e., the output payload is not empty), the host 102 can read the command payload register 236.

The mailbox registers 318 can include a mailbox function setting register 254. In an embodiment, the mailbox function setting register 254 can include multiple registers. As one example, there is a payload size register (PAYLOAD SIZE) 230. The payload size register 230 can set a size of the command payload register 236. For example, the command payload register 236 can be determined between a minimum of 256 bytes and a maximum of 1 MB.

Further, the mailbox registers 318 can include a mailbox control register 256 including multiple registers. As an example of a mailbox control register 256, there is the doorbell register 232. When the value in the doorbell register 232 is cleared (the doorbell signal is cleared), the memory system 310 can indicate that it is ready to receive another new mailbox command. After the host 102 writes a command to the command register 258, the host 102 can set the doorbell register 232 (i.e., input the doorbell signal) to inform the memory system 310 of receiving the command stored in the command register 258. When the command is completed or the command is performed as a background operation in the memory system 310, the memory system 310 can clear the value in the doorbell register (i.e., erase the doorbell signal).

In addition, the mailbox registers 318 can include a command register 258 that includes a plurality of registers. The command register 258 may include a command code register 234 and a payload length register 248. The mailbox command that may be recorded in the command code register 234 can be set by the CXL interface or the CXL protocol. In an embodiment, the mailbox command can also be set by a vendor of the host 102 or the memory system 310 such as the first to third commands described in FIG. 4. The payload length register 248 can express a data size of the command payload register 236 in bytes. Before setting the doorbell register 232, the host 102 can write a value to provide the memory system 310 with an input payload size related to the command. When the doorbell register 232 is cleared, the memory system 310 can write the payload length register 248 to provide the host 102 with an output payload size as a response for the command.

Additionally, the mailbox registers 318 can include a mailbox status register 262 including a plurality of registers. The mailbox status register 262 can include a return code register 238 for storing a result or a response for the processed command. The result stored in the return code register 238 can be valid only after the doorbell register 232 is erased or cleared. According to an embodiment, the mailbox status register 262 can further include an extended status register 244A for storing status information extended by a vendor. The mailbox status register 262 can further include a background operation register for setting the memory system 310 to perform an input command as a background operation.

The mailbox registers 318 can include a background command status register 242 including a plurality of registers. The background command status register 242 can include a background command code register (BG OPCODE) 252 for storing a command to be performed as a background operation, and a background return code register (BG RETURN CODE) 254 for storing a result of the command to be performed as the background operation. According to an embodiment, the background command status register 242 can further include an extended status register 244B for storing vendor-extended status information related to the background command.

The command payload register 236 included in the mailbox registers 318 can be written by the host 102 to provide an input payload associated with the command to the memory system 310 before a doorbell signal is input to the doorbell register 232. When the doorbell signal is cleared from the doorbell register 232, the memory system 310 can be written to provide an output payload associated with the processed command to the host 102. A size of the command payload register 236 can be determined by the payload length register 248. Data exceeding the size specified in the payload length register 248 can be ignored by the host 102 or the memory system 310.

Figure 8:
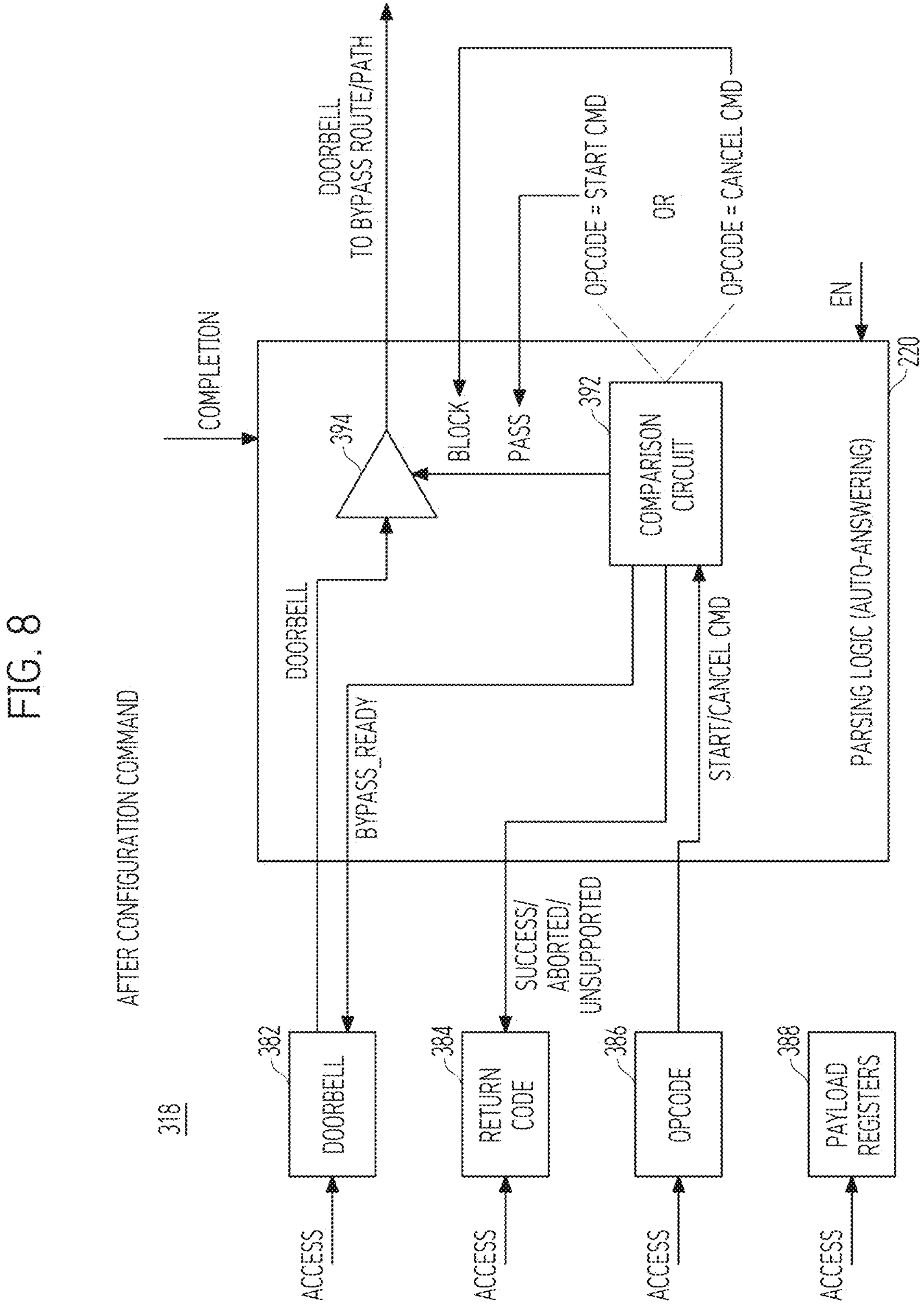
FIG. 8 describes parsing circuitry according to an embodiment of the present disclosure.

FIG. 8 describes parsing circuitry according to an embodiment of the present disclosure.

Referring to FIG. 8, the mailbox logic 316C can activate the parsing circuitry 220 in response to the first command (CONFIGURATION COMMAND). In response to the first command (CONFIGURATION COMMAND), the controller 312 can input an enable signal EN to the parsing circuitry 220.

The mailbox logic 316C can include a plurality of registers 382, 384, 386, 388 and the parsing circuitry 220. The plurality of registers 382, 384, 386, 388 can be used for storing commands input through the mailbox logic 316C or results, responses, or data output through the mailbox logic 316C. Each register 382, 384, 386, 388 can be set according to the purpose or use. Depending on the embodiment, the number of registers included in the mailbox logic 316C may vary.

Referring to FIGS. 7 and 8, among the plurality of registers 382, 384, 386, 388, the doorbell register 382 can correspond to the doorbell register 232, the return code register 384 can correspond to the return code register 238, the command code register 368 can correspond to the command code register 234, and the payload register 388 can correspond to the payload register 236. The parsing circuitry 220 may use the plurality of registers set or established in the mailbox registers 318.

Referring to FIG. 5, if the value (e.g., doorbell signal) stored in the doorbell register 382 is changed in response to the first command (CONFIGURATION COMMAND), the mailbox logic 316A can generate the interrupt request IRQ (e.g., operates in the first operation mode). In response to the first command, the controller 312 not only activates the parsing circuitry 220, but also sets the bypass route/path between the mailbox logic 316A and at least one logic 370 within the controller 312. After the parsing circuitry 220 is activated in response to the first command, the interrupt request IRQ might not be generated in response to the doorbell signal stored in the doorbell register 382 (e.g., operates in the second operation mode).

Referring to FIG. 8, after the first command (CONFIGURATION COMMAND), the host 102 can store the second command (START CMD) or the third command (CANCEL CMD) as a mailbox command in the command code register 368. A comparison circuit 392 in the parsing circuitry 220 can check whether the command stored in the command code register 368 is the second command (START CMD) or the third command (CANCEL CMD). When the second command (START CMD) is input from the host 102, the parsing circuitry 220 can transmit a PASS signal to a buffer 394 so that the doorbell signal (DOORBELL) stored in the doorbell register 382 can be transmitted through the bypass route. According to an embodiment, after setting to allow transmission of the doorbell signal through the bypass route, the parsing circuitry 220 can store a return code of 'success' in the return code register 384, as a response to the second command (START CMD).

When the third command (CANCEL CMD) is input from the host 102, the parsing circuitry 220 can transmit a BLOCK signal to the buffer 394 so that the doorbell signal (DOORBELL) stored in the doorbell register 382 would not be transmitted through the bypass route. According to an embodiment, after setting to block transmission of the doorbell signal through the bypass route, the parsing circuitry 220 can store a return code of 'aborted' in the return code register 384, as a response to the third command (CANCEL CMD).

When the host 102 may store any command other than the second command (START CMD) or the third command (CANCEL CMD) as a mailbox command in the command code register 368 after the first command (CONFIGURATION COMMAND), the parsing circuitry 220 can store a return code of 'unsupported' for the input command other than the second command (START CMD) or the third command (CANCEL CMD) in the return code register 384.

According to the embodiment, the host 102 can store the second command (START CMD) in the command code register 386 after the first command (CONFIGURATION COMMAND). The parsing circuitry 220 can request a doorbell signal stored in the doorbell register 382 (BY PASS_READY) in response to the second command (START CMD). This procedure can block the interrupt request IRQ from occurring in response to the doorbell signal stored in the doorbell register 382 based on the mailbox mechanism of the first operation mode. This procedure can allow the doorbell signal stored in the doorbell register 382 to be transmitted to the parsing circuitry 220 based on to a mechanism of the second operation mode.

When the parsing circuitry 220 transmits the doorbell signal (DOORBELL) through the bypass route, the doorbell signal can be transferred to a specific logic coupled through the bypass route to the mailbox logic 316C. In an embodiment, the specific logic can transfer a result (COMPLETION), which has been prepared in response to the first command, to the mailbox logic 316C or the parsing circuitry 220. Then, the mailbox logic 316C or the parsing circuitry 220 can store the transmitted result (COMPLETION) in the payload register 368.

According to an embodiment, the second command (START CMD) or the third command (CANCEL CMD) can include an identifier 296 that can indicate at least one logic and a logic code area 298 that includes a code value (LOGIC CODE) that indicates an operation that can be performed in the at least one logic corresponding to the identifier 296, like the first command (CONFIGURATION COMMAND). In this case, the memory system or the controller can change the bypass route formed in response to the first command (CONFIGURATION COMMAND), based on the second command (START CMD) or the third command (CANCEL CMD). For example, a bypass route between a first logic and the mailbox logic is set based on the first command, and the bypass path can be changed between a second logic, not the first logic, and the mailbox logic based on the second command. In addition, the third command can be used to release or reset a bypass path previously formed between a specific logic and the mailbox logic.

Hereinafter, with reference to FIGS. 9 to 11, when the host 102 transmits the first to third commands, as a mailbox command, to the memory system 310, operations performed in the memory system 310 will be specifically described.

Figure 9:
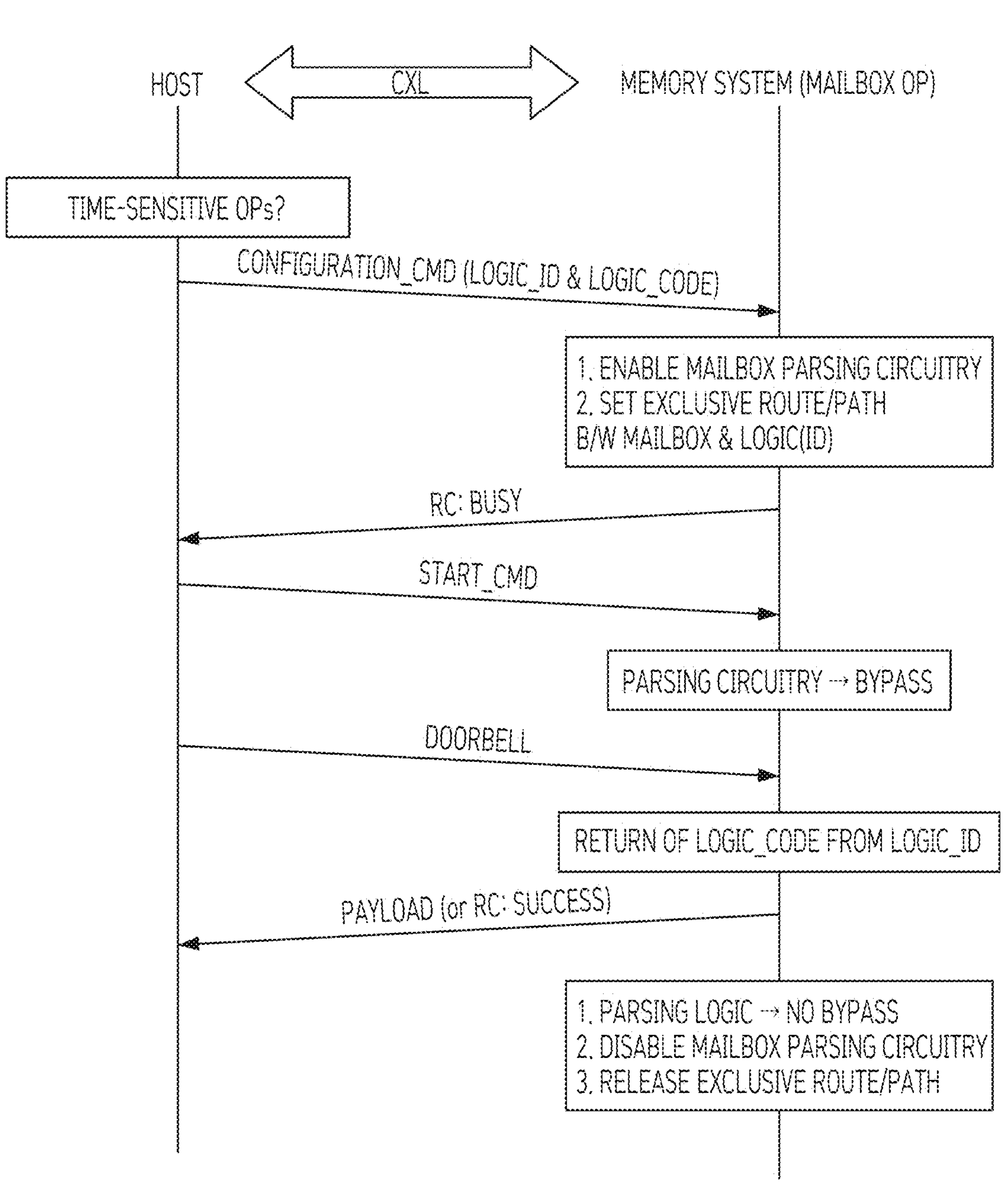
FIG. 9 describes a first operation performed in a data processing apparatus according to an embodiment of the present disclosure.

FIG. 9 describes a first operation performed in a data processing apparatus according to an embodiment of the present disclosure. Specifically, FIG. 9 specifically describes a case where a host 102 shown in FIG. 1 transmits, to a memory system 310 shown in FIG. 1, a first command (CONFIGURATION_CMD), a second command (START_CMD), and a doorbell signal (DOORBELL) sequentially.

Referring to FIG. 9, the host 102 can transmit the first command (CONFIGURATION_CMD) to the memory system 310 when the host 102 desires an operation that is sensitive to an operation time or an operation condition (Time-Sensitive Operations), an operation status of the memory system, or a result regarding specific information or data. According to an embodiment, the first command transmitted from the host 102 to the memory system 310 can also be used to collect or gather information for testing, debugging, etc. associated with operations performed in the memory system.

Here, as described in FIG. 4, the first command can include an identifier (LOGIC_ID) for one of logics or components included in the memory system 310 and a logic command code (LOGIC_CODE) regarding an operation to be performed in the logic or component corresponding to the identifier or information to be obtained from the corresponding logic or component.

In response to the first command, the memory system 310 can activate a parsing circuitry (220, see FIG. 8) in the mailbox logic. In addition, the memory system or the controller can set the bypass route (BYPASS, EXCLUSIVE ROUTE/PATH) between the mailbox logic and the logic indicated by the identifier (LOGIC_ID). The bypass route may be exclusive and independent.

In response to the first command, the mailbox logic can store a return code RC of 'busy' in the return code register (384, see FIG. 8). According to an embodiment, the mailbox logic can store a return code of 'success' in response to the first command in the return code register 384. The mailbox operation for the first command is performed in the first operation mode, so that the memory system 310 can transmit the return code corresponding to the first command within 2 seconds.

After storing the return code of 'busy' corresponding to the first command in the return code register 384, a mailbox logic of the memory system 310 can operate in the second operation mode. The host 102 can check the return code corresponding to the first command and then transmit the second command (START_CMD) to the memory system 310. The parsing circuitry 220 in the memory system 310 can be set to bypass a doorbell signal (PARSING CIRCUITRY→BYPASS). According to an embodiment, the mailbox logic in the memory system 310 can store a return code of 'success' in response to the second command in the return code register 384. The memory system 310 can store the return code for the second command within 2 seconds, 1 second, or a shorter time than 1 second (e.g., several to hundreds of nanoseconds or microseconds).

The host 102 can transmit a doorbell signal (DOORBELL) to the memory system 310 in response to a specific time or specific condition. The doorbell signal (DOORBELL) can be delivered to a specific logic indicated by the identifier (LOGIC_ID) included in the first command through the bypass route by the parsing circuitry 220. The specific logic can transmit a result for the command code (LOGIC CODE) to the mailbox logic. The memory system 310 can store a return code (RC) of 'success' in the return code register 384 in response to the doorbell signal (DOORBELL). In addition, depending on the result corresponding to the command code, the result can be stored in the payload register 368. The host 102 can take the result stored in the payload register 368. The memory system 310 can transmit the return code for the doorbell signal (DOORBELL) within a shorter time (e.g., 1 second or several to hundreds of nanoseconds or microseconds) than other mailbox commands (e.g., generally within 2 seconds).

According to an embodiment, the memory system 310 can prepare a specific result transferred to the host 102 within 2 seconds through the mailbox operation in response to the first command. However, 2 seconds is a very long time for multiple components or logics in the memory system 310. The operational status of the multiple components or logics could be changed several or tens of times within the 2 seconds. Thus, the host 102 can desire to collect information that is sensitive to a specific point in time or a specific operating condition by using the logics or components in the memory system 310, or collect results performed at a specific point in time or status information at a specific point in time. The host 102 can control the corresponding time or condition using the doorbell signal (DOORBELL) transferred after the first command, and the memory system 310 can transmit a result for the host's request in time based on the doorbell signal (DOORBELL).

When the memory system 310 provides the result or status information of a specific logic to be transferred to the host 102 in response to the doorbell signal (DOORBELL), the memory system 310 can release the second operation mode set in response to the first command (CONFIGURATION_CMD). The parsing circuitry 220 can block the doorbell signal (DOORBELL) from being transmitted through the bypass route (NO PASS). The memory system 310 or the controller 312 can inactivate the parsing circuitry 220 in the mailbox logic. In addition, the memory system 310 or the controller 312 can release or cancel the bypass route (BYPASS, EXCLUSIVE ROUTE/PATH) that was set between the mailbox logic and the logic indicated by the identifier (LOGIC_ID).

As described above, the mailbox mechanism of the memory system 310 can be designed so that the second operation mode set in response to the first command is automatically released after delivering a result for a single doorbell signal (DOORBELL) and can go back to the first operation mode. According to another embodiment, the mailbox mechanism can be designed to automatically release the second operation mode after delivering results for the doorbell signal (DOORBELL) a preset number of times in response to the identifier (LOGIC_ID) and the command code (LOGIC_CODE) included in the first command.

Figure 10:
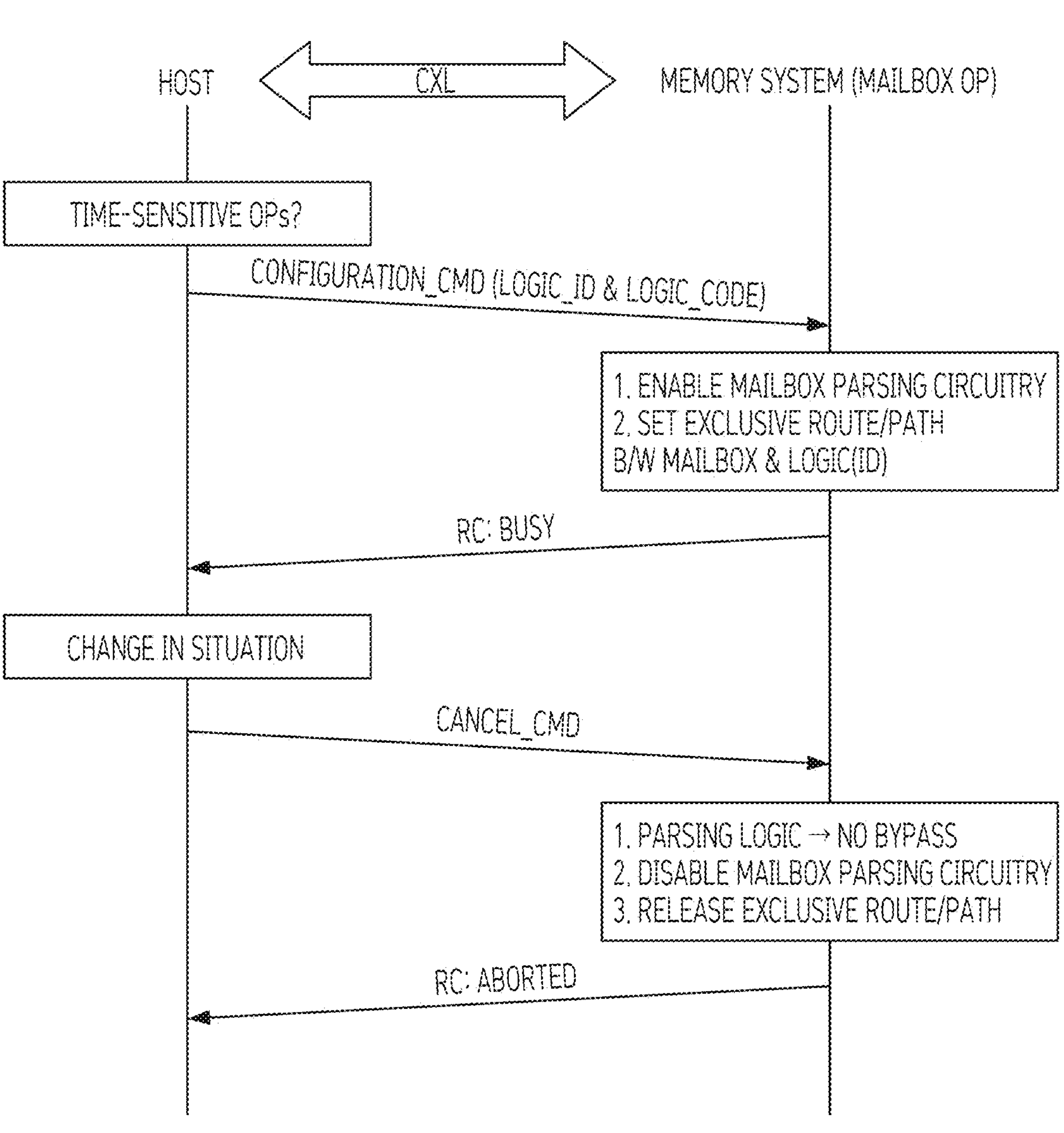
FIG. 10 describes a second operation performed in a data processing apparatus according to an embodiment of the present disclosure.

FIG. 10 describes a second operation performed in a data processing apparatus according to an embodiment of the present disclosure. Specifically, FIG. 10 describes a case where the host 102 shown in FIG. 1 transmits the first command (CONFIGURATION_CMD) to the memory system 310 shown in FIG. 1 and then transmits a third command (CANCEL_CMD).

As described in FIG. 9, when the host 102 transmits the first command (CONFIGURATION_CMD) to the memory system 310, the memory system 310 can set the mailbox operation (MAILBOX OP) to be performed from the first operation mode to the second operation mode. The memory system 310 or the controller 312 can activate the parsing circuitry 220 in the mailbox logic and set a bypass path. The mailbox logic may be in the memory system (310). In response to the first command, a return code (RC) of 'busy' can be stored in the return code register 384 shown in FIG. 8.

After transmitting the first command (CONFIGURATION_CMD), a situation or a status of the host 102 could be changed (CHANGE IN SITUATION). For example, the host 102 may not want the memory system 310 to operate in the second operation mode, after transferring the first command (CONFIGURATION_CMD). In addition, the host 102 may want to change the mailbox operation of the memory system 310 to be performed in the first operation mode, not the second operation mode. The host 102 can transfer the third command (CANCEL_CMD) to the memory system 310. Based on the third command (CANCEL_CMD), the memory system 310 can release the second operation mode set in response to the first command (CONFIGURATION_CMD). The parsing circuitry 220 can block the doorbell signal (DOORBELL) from being transmitted through the bypass route (NO PASS). The memory system 310 or the controller 312 can inactivate the parsing circuitry 220 in the mailbox logic. In addition, the memory system 310 or the controller 312 can cancel or release the bypass route (BYPASS, EXCLUSIVE ROUTE/PATH) established between the mailbox logic and the logic indicated by the identifier (LOGIC_ID). The mailbox logic in the memory system 310 can store a return code (RC) of 'aborted' in the return code register 384 in response to the third command (CANCEL_CMD).

The host 102 can use the third command (CANCEL_CMD) to convert the mailbox operation of the memory system 310 from the second operation mode to the first operation mode.

Figure 11:
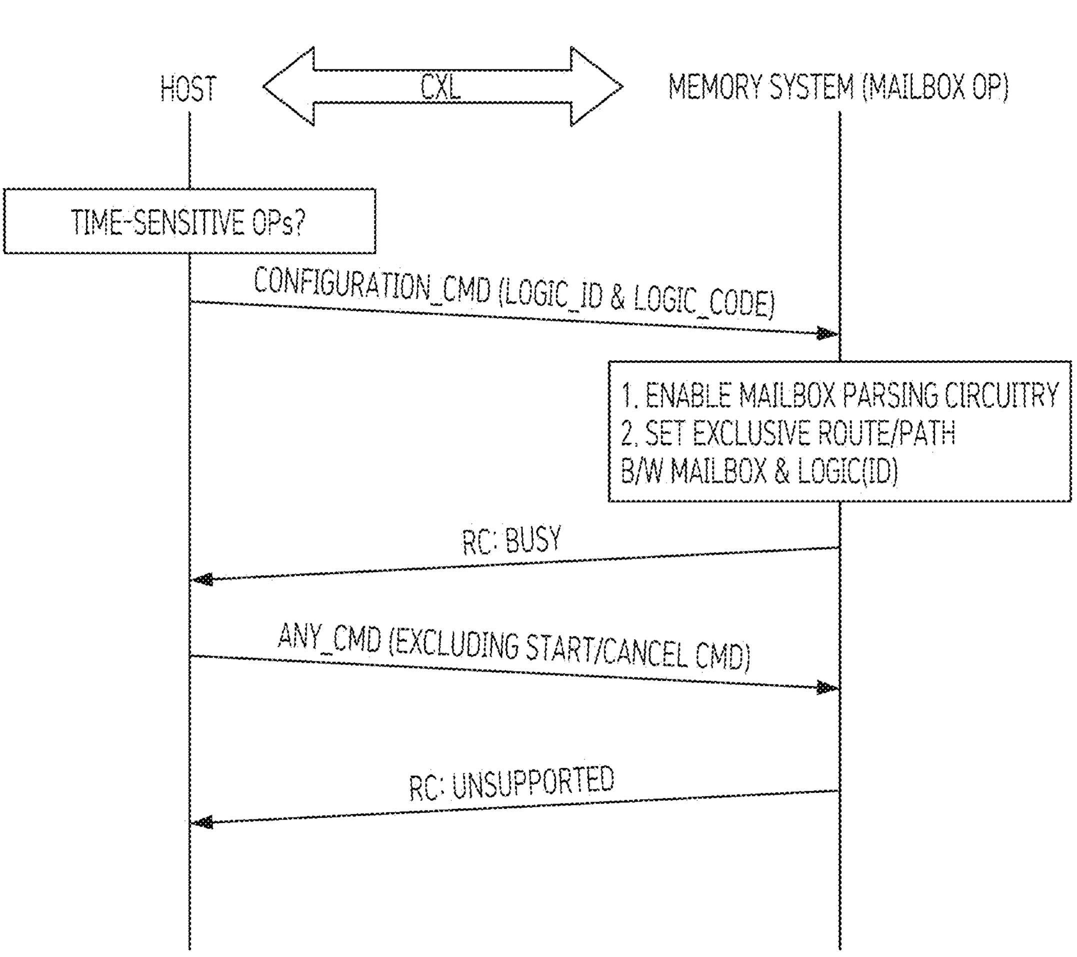
FIG. 11 describes a third operation performed in a data processing apparatus according to an embodiment of the present disclosure.

FIG. 11 describes a third operation performed in a data processing apparatus according to an embodiment of the present disclosure. Specifically, FIG. 11 describes a case where a host 102 shown in FIG. 1 transmits the first command (CONFIGURATION_CMD) to the memory system 310 shown in FIG. 1 and then transmits any command (ANY_CMD) other than the second command (START_CMD) and the third command (CANCEL_CMD).

As described in FIGS. 9 and 10, when the host 102 transmits the first command (CONFIGURATION_CMD) to the memory system 310, the memory system 310 can set the mailbox operation (MAILBOX OP) to be performed from the first operation mode to the second operation mode. The memory system 310 or the controller 312 can activate the parsing circuitry 220 in the mailbox logic and set the bypass path. The mailbox logic in the memory system 310 may store the return code (RC) of 'busy' in the return code register 384 shown in FIG. 8 in response to the first command.

After transmitting the first command (CONFIGURATION_CMD), the mailbox command transmitted by the host (102) to the memory system (310) may not be the second command (START_CMD) or the third command (CANCEL_CMD). If the memory system 310 recognizes a command other than the second command (START_CMD) or the third command (CANCEL_CMD) in the command code register 386 after receiving the first command (CONFIGURATION_CMD), the memory system 310 can store a return code (RC) of 'unsupported' in response to the command stored in the return code register 384.

Referring to FIGS. 9 to 11, when the first to third commands described in FIG. 4 are transmitted from the host 102 to the memory system 310 as mailbox commands, which operation mode the mailbox operation (MAILBOX OP) of the memory system 310 can be performed in, is described. The host 102 and the memory system 310 can exchange status information, etc., which is sensitive to time or corresponds to a specific condition, through the mailbox commands including the first to third commands.

In addition, the host in the data processing apparatus according to one embodiment of the present disclosure can more easily perform data communication with the memory system through a preset command, and the memory system can change configuration of the mailbox logic and selectively operate one of plural operation modes in response to the host's command, thereby improving or enhancing transaction and operation efficiency of the data processing apparatus.

Further, the memory system according to an embodiment of the present disclosure can satisfy a time condition through the bypass route in response to a time-conditional command of the host. Thus, a size of a circuit or logic for performing the command and a size of registers (e.g., Designated Vendor-Specific Extended Capabilities (DVSEC) registers) additionally set to store results of the background operation performed by the circuit or logic could be reduced.

In addition, the host interlocked with the memory system according to an embodiment of the present disclosure can determine a timing of transferring the doorbell signal to obtain a result of the time-conditional command to be performed within the memory system. Thus, the host does not have to configure a separate algorithm or kernel for transmitting the time-conditional command to the memory system in a timely manner.

Figure 12:
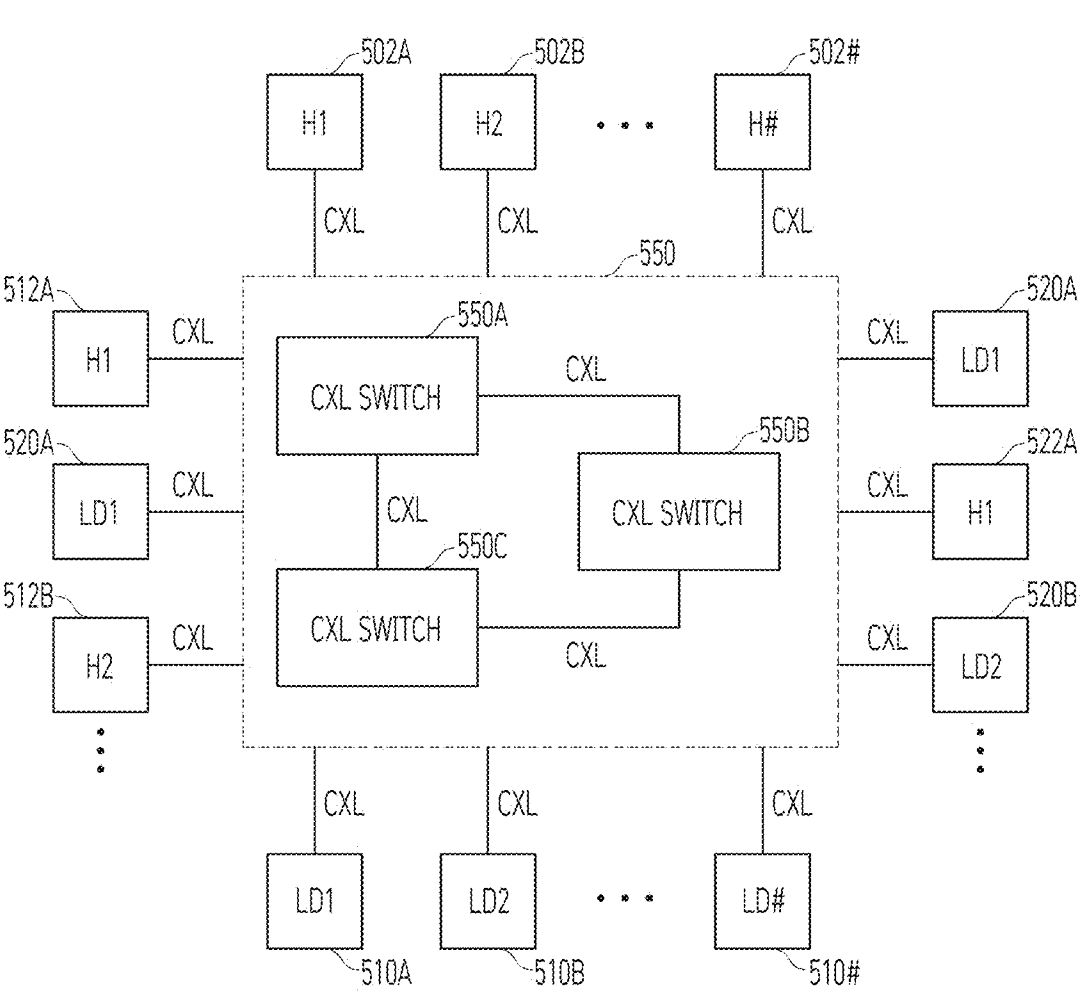
FIG. 12 illustrates a data infrastructure according to an embodiment of the present disclosure.

FIG. 12 illustrates a data infrastructure according to an embodiment of the present disclosure. Specifically, FIG. 12 illustrates a plurality of hosts, a plurality of logical devices, a Compute Express Link (CXL) switch, and a Compute Express Link (CXL) interface included in the data infrastructure.

Referring to FIG. 12, the data infrastructure can include a plurality of hosts 502A, 502B, . . . , 502 #, 512A, 512B, 522A and a plurality of logical devices 510A, 510B, . . . , 510 #, 520A, 520B. The plurality of hosts 502A, 502B, . . . , 502 #, 512A, 512B, 522A and the plurality of logical devices 510A, 510B, . . . , 510 #, 520A, 520B can be coupled by a connection device 550 including at least one CXL switch 550A, 550B, 550C.

Data infrastructure may refer to a digital infrastructure that promotes data sharing and consumption. Like other infrastructures, the data infrastructure can include structures, services, and facilities that are necessary for data sharing and consumption. For example, the data infrastructure includes a variety of components, including hardware, software, networking, services, policies, and etc. that enable data consumption, storage, and sharing. The data infrastructure can provide a foundation for creating, managing, using, and protecting data.

For example, the data infrastructure can be divided into physical infrastructure, information infrastructure, business infrastructure, and the like. The physical infrastructure may include a data storage device, a data processing device, an input/output network, a data sensor facility, and the like. The information infrastructure may include data repositories such as business applications, databases, and data warehouses, virtualization systems, and cloud resources and services including virtual services, and the like. The business infrastructure may include business intelligence (BI) systems and analytics tools systems such as big data, artificial intelligence (AI), machine learning (ML), and the like.

The plurality of host systems 502A, 502B, . . . , 502 #, 512A, 512B, 522A can be understood as computing devices such as personal computers and workstations. For example, a first host system 502A can include a host processor (CPU) 104A, a host memory 106 shown in FIG. 1. The host processor (CPU) 104A can perform data processing operations in response to user's needs, temporarily store data used or generated in the process of performing the data processing operations in the host memory 106 as an internal volatile memory, or transfer and store the data in the plurality of logical devices 510A, 510B, . . . , 510 #, 520A, 520B as needed.

When a user performs tasks that require many high speed operations, such as calculations or operations related to artificial intelligence (AI), machine learning (ML), and big data, resources such as a host memory 106 included in the first host system 502A might not be sufficient. The plurality of logical devices 510A, 510B, . . . , 510 #, 520A, 520B coupled to the first host system 502A can be used to overcome a limitation of internal resources such as the host memory 106.

Referring to FIG. 12, the connection device 550 can couple the plurality of host processors 502A, 502B, . . . , 502 #, 512A, 512B, 522A and the plurality of logical devices 510A, 510B, . . . , 510 #, 520A, 520B to each other. According to an embodiment, some of host processors could constitute a single system. In another embodiment, each host processor could be included in a distinct and different system. Further, according to an embodiment, some of logical devices could constitute a single shared memory device. In another embodiment, each logical device could be included in a distinct and different shared memory device.

A data storage area included in the plurality of logical devices 510A, 510B, . . . , 510 #, 520A, 520B can be exclusively assigned or allocated to the plurality of host systems 510A, 510B, . . . , 510 #, 520A, 520B. For example, the entire storage space of the storage LD1 of first logical device 510A may be exclusively allocated to and used by the first host system 502A. That is, another host system might not access the storage LD1 in first logical device 510A while the storage LD1 is allocated to the first host system 502A. A partial storage space in the storage LD2 of second logical device 510B may be allocated to the first host system 504A, while another portion therein may be allocated to the third host system 504C. In addition, a partial storage space in the storage LD2 of second logical device 510B might not be used by another host system except for the storage LD2 of second logical device. The storage LD3 of third logical device 510C may be allocated to, and used by, the second host system 504B and the third host system 512A. The storage LD4 of fourth logical device 510D may be allocated to, and used by, the first host system 504A, the second host system 504B, and the third host system 512A.

In the plurality of logical devices 510A, 510B, . . . , 510 #, 520A, 520B, unallocated storage spaces can be further allocated to the plurality of host systems 510A, 510B, . . . , 510 #, 520A, 520B based on a request of the plurality of host systems 510A, 510B, . . . , 510 #, 520A, 520B. Further, the plurality of host systems 510A, 510B, . . . , 510 #, 520A, 520B can request deallocation or release of the previously allocated storage space. In response to the request of the plurality of host systems 510A, 510B, . . . , 510 #, 520A, 520B, the connection device 550 can control connection or data communication between the plurality of host systems 510A, 510B, . . . , 510 #, 520A, 520B and the plurality of logical devices 510A, 510B, . . . , 510 #, 520A, 520B.

Referring to FIG. 12, the plurality of host systems 510A, 510B, . . . , 510 #, 520A, 520B may include the same component, but their internal components may be changed according to an embodiment. In addition, the plurality of logical devices 510A, 510B, . . . , 510 #, 520A, 520B may include the same component, but their internal components may be changed according to an embodiment.

According to an embodiment, the connection device 550 can be configured to utilize the plurality of logic devices 510A, 510B, . . . , 510 #, 520A, 520B to provide versatility and scalability of resources, so that the plurality of host systems 510A, 510B, . . . , 510 #, 520A, 520B can overcome limitations of internal resources. Herein, Compute Express Link (CXL) is a type of interface which utilizes different types of devices more efficiently in a high-performance computing system such as artificial intelligence (AI), machine learning (ML), and big data. For example, when the plurality of logical devices 510A, 510B, . . . , 510 #, 520A, 520B includes a CXL-based DRAM device, the plurality of host systems 510A, 510B, . . . , 510 #, 520A, 520B may expanded memory capacity available for storing data.

If the connection device 550 provides cache consistency, there may be delays in allowing other processors to use variables or data updated by a specific processor in a process of sharing the variables or the data stored in a specific memory area. To reduce the delay in using the plurality of logical devices 510A, 510B, . . . , 510 #, 520A, 520B, a Compute Express Link (CXL) protocol or interface through the CXL switch 120 can assign a logical address range to memory areas in the plurality of logical devices 510A, 510B, . . . , 510 #, 520A, 520B. The logical address range is used by the plurality of host systems 510A, 510B, . . . , 510 #, 520A, 520B. Using a logical address in the logical address range, the plurality of host systems 510A, 510B, . . . , 510 #, 520A, 520B can access the memory areas allocated to the plurality of host systems 510A, 510B, . . . , 510 #, 520A, 520B. When each of the plurality of host systems 510A, 510B, . . . , 510 #, 520A, 520B requests a storage space for a specific logical address range, an available memory area included in the plurality of logical devices 510A, 510B, . . . , 510 #, 520A, 520B can be allocated for the specific logical address range. When each of the plurality of host systems 510A, 510B, . . . , 510 #, 520A, 520B requests a memory area based on different logical addresses or different logical address ranges, memory areas in the plurality of logical devices 510A, 510B, . . . , 510 #, 520A, 520B can be allocated for the different logical addresses or the different logical address ranges. If the plurality of host systems 510A, 510B, . . . , 510 #, 520A, 520B does not use a same logical address range, however, then a variable or data assigned to a specific logical address might not be shared by the plurality of host systems 510A, 510B, . . . , 510 #, 520A, 520B. Each of the plurality of host systems 510A, 510B, . . . , 510 #, 520A, 520B can use the plurality of logical devices 510A, 510B, . . . , 510 #, 520A, 520B as a memory expander to overcome limitations of their internal resources.

According to an embodiment, the plurality of logic devices 510A, 510B, . . . , 510 #, 520A, 520B may include a controller and a plurality of memories. The controller could be connected to the connection device 550 and control the plurality of memories. The controller can perform data communication with the connection device 550 through a Compute Express Link (CXL) interface. Further, the controller can perform data communication through a protocol and an interface supported by the plurality of memories. According to an embodiment, the controller can distribute data input/output operations transmitted to a shared memory device and manage power supplied to the plurality of memories in the shared memory device. Depending on an embodiment, the plurality of memories can include a dual in-line memory module (DIMM), a memory add-in card (AIC), a non-volatile memory device supporting various connections (e.g., EDSFF 1U Long (E1 L.), EDSFF 1U Short (E1 S.), EDSFF 3U Long (E3U Long), EDSF (E3U Short), etc.).

The memory areas included in the plurality of logical devices 510A, 510B, . . . , 510 #, 520A, 520B may be allocated for, or assigned to, the plurality of host systems 510A, 510B, . . . , 510 #, 520A. A size of memory area allocated for, or assigned to, the plurality of host systems 510A, 510B, . . . , 510 #, 520A can be changed or modified in response to a request from the plurality of host systems 510A, 510B, . . . , 510 #, 520A. In FIG. 12, it is shown that the plurality of host systems 510A, 510B, . . . , 510 #, 520A is coupled to the plurality of logic devices 510A, 510B, . . . , 510 #, 520A, 520B through the connection device 550. However, according to an embodiment, the storage areas included in the plurality of logical devices 510A, 510B, . . . , 510 #, 520A, 520B may also be allocated for, or assigned to, a virtual machine (VM) or a container. Herein, a container is a type of lightweight package that includes application codes and dependencies such as programming language runtimes and libraries of a specific version required to run software services. The container could virtualize the operation system. The container can run anywhere from a private data center to a public cloud or even on a developer's personal laptop.

According to an embodiment, at least one host and at least one logical device or memory system can perform data communication through a CXL interface or CXL protocol that supports memory pooling and memory sharing. The memory pooling can allow multiple hosts of a heterogeneous topology to access a common memory address range, and each host can be assigned a non-overlapping address range from a pool of memory resources. Through the memory pooling, a data infrastructure or a data processing apparatus can dynamically allocate a storage area or a memory area within the pool, thereby reducing a wasted memory and increasing memory utilization. The CXL interface or CXL protocol can provide effects such as efficient memory allocation, guaranteed memory access, memory isolation between multiple hosts or processors, and data or system security.

The memory sharing can allow multiple hosts of a heterogeneous topology to access a common memory address range, and each host and other hosts may be assigned the same address range. Because multiple hosts can access the same data, data flow can be efficient, but the data infrastructure or data processing apparatus can manage coherency between the hosts to avoid data from being incorrectly overwritten by other hosts. The CXL interface or CXL protocol can provide effects such as efficient data communication, low latency, and reduced power consumption between multiple hosts or processors.

According to an embodiment, the plurality of host systems 510A, 510B, . . . , 510 #, 520A can send raw commands to the plurality of logical devices 510A, 510B, . . . , 510 #, 520A, 520B. A raw command can send a command or code (opcode) specified by user space to the underlying hardware and bypass all driver checks for the command. The raw command is one of the commands supported by the CXL protocol or interface or promised by vendors. The raw command can enable direct control of a specific hardware device. For example, tasks such as memory access or data read/write can be performed through raw commands. The raw command can be transmitted through the mailbox 118. According to an embodiment, when the raw command is input to the doorbell register 382, the mailbox logic can generate an interrupt request IRQ. In addition, the raw command can also be used for the purpose of obtaining results in a timely manner by transmitting the mailbox command such as the first to third commands described in FIG. 4.

Figure 13:
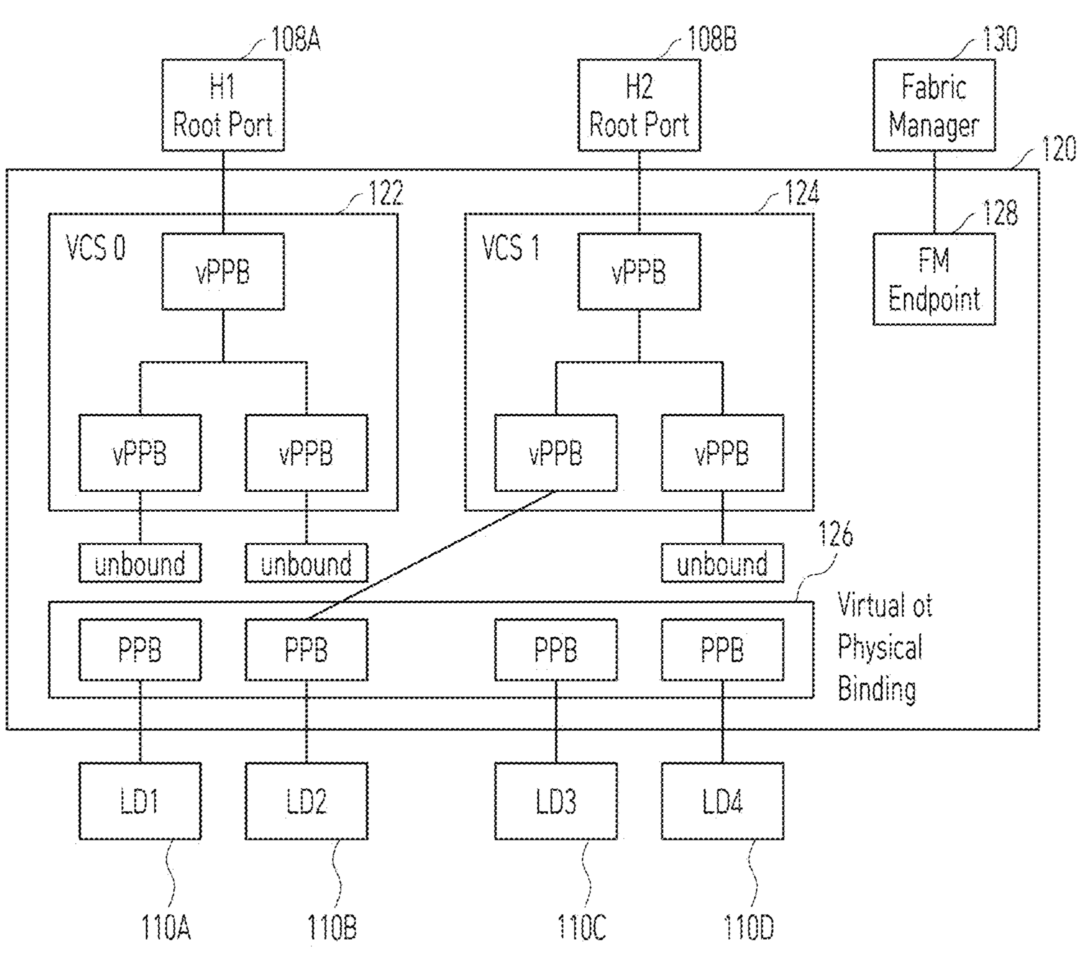
FIG. 13 illustrates a Compute Express Link (CXL) switch according to an embodiment of the present disclosure.

FIG. 13 illustrates a Compute Express Link (CXL) switch according to an embodiment of the present disclosure. The CXL switch 120 described in FIG. 13 can correspond to at least one CXL switch 550A, 550B, 550C included in the connection device 550 described in FIG. 12.

Referring to FIG. 13, a plurality of root ports 108A, 108B and a plurality of logic devices 110A, 110B, 110C, 110D may be coupled through a CXL switch 120.

According to an embodiment, the plurality of root ports 108A, 108B may be included in a root complex located between the plurality of logical devices 110A, 110B, 110C, 110D supporting a Compute Express Link (CXL) interface and the plurality of host processors 104A, 104B, 104C, 104D, . . . , 104# shown in FIG. 1. The root complex is an interface located between the plurality of host processors 104A, 104B and a connection component such as a PCIe Bus. The root complex may include several components, several chips, system software, and the like, such as a processor interface, a DRAM interface, and the like. The root complex can logically combine hierarchical domains such as PCIe into a single hierarchy. Each fabric instance may include a plurality of logical devices, switches, bridges, and the like. The root complex can calculate a size of a storage space in each logical device and map the storage space to an operating system, to generate an address range table. According to an embodiment, the plurality of host processors 104A, 104B may be connected to different root ports 108A, 108B respectively to configure different host systems.

The root ports 108A, 108B may refer to a PCIe port included in the root complex that forms a part of PCIe interconnection hierarchy through a virtual PCI-PCI bridge which is coupled to the root ports 108A, 108B. Each of the root ports 108A, 108B may have a separate hierarchical area. Each hierarchical area may include one endpoint, or sub-hierarchies including one or more switches or a plurality of endpoints. Herein, an endpoint may refer to one end of the communication channel. The endpoint may be determined according to circumstances. For example, in a case of physical data communication, an endpoint may refer to a server or a terminal, which is the last device connected through a data path. In terms of services, an endpoint may indicate an Internet identifier (e.g., uniform resource identifiers, URIs) corresponding to one end of the communication channel used when using a service. An endpoint may also be an Internet identifier (URIs) that enables an Application Programming Interface (API), which is a set of protocols that allow two systems (e.g., applications) to interact or communicate with each other, to access resources on a server.

The CXL switch 120 is a device that can attach the plurality of logical devices 110A, 110B, 110C, 110D, which are multiple devices, to one root port 108A or 108B. The CXL switch 120 can operate like a packet router and recognize which path a packet should go through based on routing information different from an address of the packet. Referring to FIG. 13, the CXL switch 120 can include a plurality of bridges.

Here, Compute Express Link (CXL) is a dynamic multi-protocol technology designed to support accelerators and memory devices. CXL can provide a set of protocols including protocols (e.g., CXL.io) that include PCIe-like I/O semantics, protocols (e.g., CXL.cache) that include caching protocol semantics, and protocols including memory access semantics over individual or on-package (on-package) links. Semantics may refer to prediction and ascertainment of what will happen and what the outcome will be to the meaning given by units such as expressions, sentences, and program codes when a program or an application, which is configured of a language which is a type of communication system governed by sentence generation rules in which elements are combined in various ways. For example, a first CXL protocol (CXL.io) can be used for search and enumeration, error reporting, and Host Physical Address (HPA) inquiry. A second CXL protocol (CXL.mem) and a third CXL protocol (CXL.cache) may be selectively implemented and used by a specific accelerator or a memory device usage model. The CXL interface can provide low-latency, high-bandwidth paths for an accelerator to access a system or for a system to access a memory connected to a memory system.

The Compute Express Link (CXL) switch 120 is an interconnect device for connecting the plurality of root ports 108A, 108B and the plurality of logic devices 110A, 110B, 110C, 110D supporting CXL-based data communication. For example, the plurality of logical devices 110A, 110B, 110C, 110D may refer to a PCIe-based device or a logical device LD. Here, PCIe (i.e., Peripheral Component Interconnect Express) refers to a protocol or an interface for connecting a computing device and a peripheral device. Using a slot or a specific cable to connect a host such as a computing device to a memory system such as a peripheral device connected to the computing device, PCIe can have a bandwidth over several hundreds of MBs per second (e.g., 250 MB/s, 500 MB/s, 984.6250 MB/s, 1969 MB/s, etc.) by using a plurality of pins (e.g., 18, 32, 49, 82, etc.) and at least one wire (e.g., x1, x4, x8, x16). Using CXL switching and pooling, the plurality of host processors and the plurality of logical devices can be connected through the CXL switch 120, and all or a part of each logical device connected to the CXL switch 120 can be assigned as a logical device to several host processors. A logical device LD is an entity that refers to a CXL endpoint bound to a virtual CXL switch (VCS).

According to an embodiment, the logical device LD may include a single logical device (Single LD) or a multi-logical device (MLD). The plurality of logical devices 110A, 110B, 110C, 110D that support the Compute Express Link (CXL) interface could be partitioned into up to 16 distinguished logical devices like a memory managed by the host. Each logical device can be identified by a logical device identifier LD-ID used in the first CXL protocol (CXL.io) and the second CXL protocol (CXL.mem). Each logical device can be identified in the virtual hierarchy (VH). A control logic or circuit included in each of the plurality of logic devices 110A, 110B, 110C, 110D may control and manage a common transaction and link layer for each protocol. For example, the control logic or circuit in the plurality of logic devices 110A, 110B, 110C, 110D can access various architectural functions, control, and status registers through an Application Programming Interface (API) provided by a fabric manager 130, so that the logic device LD can be configured statically or dynamically.

Referring to FIG. 13, the CXL switch 120 can include a plurality of virtual CXL switches 122, 124. The virtual CXL switch (VCS) 122, 124 may include entities within a physical switch belonging to a single virtual hierarchy (VH). Each entity may be identified using a virtual CXL switch identifier VCS-ID. The virtual hierarchy (VH) may include a rendezvous point (RP), a PCI-to-PCI bridge (PPB) 126, and an endpoint. The virtual hierarchy (VH) may include everything arranged under the rendezvous point (RP). The structure of the CXL virtual layer may be similar to that of PCIe. A port connected to a virtual PCI-PCI bridge (vPPB) and a PCI-PCI bridge (PPB) inside a CXL switch 120 controlled by the fabric manager (FM) 130 can provide or block connectivity in response to various protocols (PCIe, CXL 1.1, CXL 2.0 SLD, CXL 2.0 MLD, or CXL 3.0 MLD). Here, the fabric manager (FM) 130 can control an aspect of the system related to binding and management of pooled ports and devices. The fabric manager (FM) 130 can be considered a separate entity distinguished from a switch or host firmware. In addition, virtual PCI-PCI bridges (vPPBs) and PCI-PCI bridges (PPBs) controlled by the fabric managers (FM) 130 can provide data links including traffic from multiple virtual CXL switches (VCS) or unbound physical ports. Messages or signals by the fabric manager (FM) 130 can be delivered to a fabric manager (FM) endpoint 128 in the CXL switch 120, and the CXL switch 120 can control multiple switches or bridges included therein based on the message or signal delivered to the fabric manager endpoint 128.

According to an embodiment, the CXL switch 120 can include a PCI-PCI bridge PPB 126 corresponding to each of the plurality of logic devices 110A, 110B, 110C, 110D. The plurality of logic devices 110A, 110B, 110C, 110D may have a 1:1 corresponding relationship with the PCI-PCI bridge PPB 126. In addition, the CXL switch 120 can include a virtual PCI-PCI bridge (vPPB) corresponding to each of the plurality of root ports 108A, 108B. The plurality of root ports 108A, 108B and the plurality of virtual PCI-PCI bridges vPPB 122, 124 may have a 1:1 corresponding relationship. The CXL switch 120 may have a different configuration corresponding to the number of the plurality of root ports 108A, 108B and the number of the plurality of logic devices 110A, 110B, 110C, 110D.

Referring to FIG. 13, the fabric manager (FM) 130 may connect one virtual PCI-PCI bridge (vPPB) among the second virtual CXL switches 122 with one PCI-PCI bridge (PPB) among PCI-PCI bridges (PPBs) 126 and unbind other virtual PCI-PCI bridges (vPPB) included in the first CXL switches 122 and the second virtual CXL switches 124 to any PCI-PCI bridge (PPB) among PCI-PCI bridges (PPBs) 126. That is, connectivity between the first CXL switches 122, or the second virtual CXL switches 124, and the PCI-PCI bridges (PPBs) 126 may be achieved selectively. Like this configuration, the CXL switch 120 can perform a function of connecting a virtual layer to a physical layer (Virtual to Physical Binding).

Referring to FIGS. 12 and 13, the storage space (e.g., memory areas) in the plurality of logic devices 110A, 110B, 110C, 110D, . . . , 110# may be shared by the plurality of host systems 510A, 510B, . . . , 510 #, 520A. For example, the storage space of the first logical device storage LD1 may be configured to store data corresponding to a logical address range of 1 to 100, and the storage space of the second logical device storage LD2 may be configured to store data corresponding to another logical address range of 101 to 200. The plurality of logical devices 110A, 110B, 110C, 110D can be accessed through logical addresses of 1 to 400. Further, the plurality of host systems 510A, 510B, . . . , 510 #, 520A can share access information regarding which host processor uses or accesses the storage space in the plurality of logical devices 110A, 110B, 110C, 110D based on the logical addresses of 1 to 400. For example, logical addresses of 1 to 50 may be assigned to, and allocated for, the first host system 510A, and other logical addresses of 51 to 100 may be assigned to, and allocated for, the second host system 510B. In addition, other logical addresses of 101 to 200 may be assigned to, and allocated for, the first host system 510A.

A range of logical addresses assigned to each logical device in the plurality of logical devices 110A, 110B, 110C, 110D can be different in response to a size of the storage space of the logical device included in the shared memory device. In addition, a storage space that has been allocated to the plurality of host systems 510A, 510B, . . . , 510 #, 520A may be released in response to a release request of the plurality of host systems 510A, 510B, . . . , 510 #, 520A.

As above described, a memory system according to an embodiment of the present disclosure can improve performance and operational safety by responding to a host's request or command input through the Compute Express Link (CXL) protocol within a preset time. The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the embodiments of the present disclosure have been illustrated and described with respect to the specific embodiments, it will be apparent to those skilled in the art in light of the present disclosure that various changes and modifications may be made without departing from the spirit and scope of the present disclosure as defined in the following claims. Furthermore, the embodiments may be combined to form additional embodiments.

What is claimed is:

1. A memory system comprising:
at least one memory device; and
a controller comprising
at least one mailbox configured to receive a doorbell signal to output an interrupt signal,
a processor configured to process a mailbox command based on the interrupt signal, and
at least one logic configured to perform a preset operation, wherein the at least one mailbox is configured to:

transfer, to the processor, the interrupt signal based on a first doorbell signal corresponding to a first command for causing setting of a bypass route for the at least one logic when receiving the first command input from a host; and transfer, through the bypass route, to the at least one logic, a second doorbell signal corresponding to a second command when receiving the second command input from the host.

2. The memory system according to claim 1, wherein an operation code corresponding to the first command is input to a command register, and wherein an identifier used to specify a first logic among the at least one logic, and an operation code corresponding to a logic command to be performed by the first logic, which are accompanied by the first command, are input to a payload register.

3. The memory system according to claim 2, wherein the at least one mailbox is configured to generate, in response to the first command, a return code of 'busy' within 2 seconds after the first command is input.

4. The memory system according to claim 2, wherein the controller is configured to activate parsing circuitry included in the at least one mailbox, in response to the first command.

5. The memory system according to claim 4, wherein the parsing circuitry is configured to couple, for transferring a doorbell signal input to the at least one mailbox to the first logic, a doorbell register to the bypass route in response to the second command input from the host.

6. The memory system according to claim 5, wherein the first logic is configured to transfer, in response to the doorbell signal, a response corresponding to the logic command accompanied by the first command to the at least one mailbox.

7. The memory system according to claim 5, wherein, when the response is transferred to the at least one mailbox, the parsing circuitry is configured to block a connection between the doorbell register and the bypass route, and the controller is configured to release or interrupt the bypass route between the at least one mailbox and the first logic.

8. The memory system according to claim 5, wherein the parsing circuitry is configured to block a connection between the doorbell register and the bypass route after transferring the doorbell signal a preset number of times, and wherein the controller is configured to release or interrupt the bypass route between the at least one mailbox and the first logic when the connection between the doorbell register and the bypass route is blocked.

9. The memory system according to claim 5, wherein the controller is configured to interrupt the bypass route between the at least one mailbox and the first logic when the parsing circuitry recognizes a third command input from the host.

10. The memory system according to claim 9, wherein the parsing circuitry is inactivated based on the third command.

11. The memory system according to claim 9, wherein the parsing controller is further configured to generate a return code of 'unsupported' in response to a command, input from the host after the second command, other than the third command.

12. The memory system according to claim 11, wherein operation codes corresponding to the second command and the third command are input to a command register, and wherein input payloads accompanied by the second command and the third command are empty.

13. The memory system according to claim 1, wherein the controller is configured to perform data input/output operations to the at least one memory device, regardless of the first command input to the at least one mailbox.

14. The memory system according to claim 1, wherein the at least one logic is configured to perform detailed operations associated with data input/output operations within the controller, or perform a background operation for the data input/output operations.

15. A controller comprising:

at least one processor configured to execute a first command input from an external device, wherein the first command is for causing setting of a bypass route for at least one logic;

the at least one logic configured to perform a preset operation; and a mailbox configured to transfer a doorbell signal through the bypass route to the at least one logic after transferring an interrupt signal corresponding to the first command to the at least one processor.

16. The controller according to claim 15, wherein the first command comprises an identifier used to specify a first logic among the at least one logic and an operation code corresponding to a logic command to be performed by the first logic.

17. The controller according to claim 16, wherein the at least one processor comprises a handler configured to process the interrupt signal, and wherein the at least one processor is configured to set, in response to the first command, the bypass route coupling the first logic to the mailbox.

18. The controller according to claim 17, wherein the bypass route is exclusive for the first logic, and wherein the mailbox is configured to respond to the external device with a return code of 'busy' in response to the first command.

19. The controller according to claim 15, wherein the mailbox comprises:

plural registers comprising a doorbell register, a command register, a return code register, and a payload register; and parsing circuitry configured to parse a second command and a third command input through the command register from the external device and determine whether to transfer the doorbell signal input through the doorbell register to the at least one logic.

20. The controller according to claim 19, wherein the at least one processor is configured to activate the parsing circuitry in response to the first command, and wherein the parsing circuitry is configured to:

transfer the doorbell signal to the at least one logic in response to the second command; and block the doorbell signal from being transmitted to the at least one logic in response to the third command.

* * * * *